United States Patent [19]
Schwartz et al.

[11] Patent Number: 5,096,090
[45] Date of Patent: Mar. 17, 1992

[54] AUTOMATIC DISTRIBUTION MACHINE

[75] Inventors: Morris A. Schwartz, Watchung, N.J.;
Yevgeny Antonovsky, Brooklyn;
Menachem Futter, Staten Island,
both of N.Y.

[73] Assignee: Revlon, Inc., New York, N.Y.

[21] Appl. No.: 401,342

[22] Filed: Aug. 31, 1989

[51] Int. Cl.⁵ ............................................. B65G 17/00
[52] U.S. Cl. ........................................ 221/125; 221/2;
221/126; 221/129; 221/130; 221/131; 221/197;
414/267; 198/817
[58] Field of Search ................... 414/331, 267, 266;
221/125, 126, 129, 130, 131, 75, 253, 277, 287,
197, 2; 186/55, 69, 64, 68; 198/817; 364/478

[56] References Cited
U.S. PATENT DOCUMENTS

| | | |
|---|---|---|
| 2,500,437 | 3/1950 | Tandler et al. . |
| 2,500,438 | 3/1950 | Tandler et al. . |
| 2,584,628 | 2/1952 | Skillman ................... 186/69 |
| 2,652,301 | 9/1953 | Skillman et al. . |
| 2,715,950 | 8/1955 | Law . |
| 2,733,833 | 2/1956 | Skillman . |
| 3,034,665 | 5/1962 | Speaker . |
| 3,123,082 | 3/1964 | Call et al. . |
| 3,383,011 | 5/1968 | Reed et al. . |
| 3,596,752 | 8/1971 | Garvey . |
| 3,624,792 | 1/1970 | Lipfort . |
| 3,647,051 | 3/1972 | Didas . |
| 3,675,816 | 7/1972 | Bourke, II et al. . |
| 3,729,117 | 4/1973 | Naito et al. . |
| 3,849,968 | 11/1974 | Tateisi . |
| 3,881,594 | 5/1975 | Jepsen . |
| 3,924,709 | 12/1975 | Swanson ................... 186/64 |
| 4,061,245 | 12/1977 | Lotspeich ................... 221/75 |
| 4,108,333 | 8/1978 | Falk et al. . |
| 4,192,436 | 3/1980 | Schuller et al. . |
| 4,349,126 | 9/1982 | Brown . |
| 4,501,528 | 2/1985 | Knapp . |
| 4,511,028 | 4/1985 | Meister . |
| 4,518,302 | 5/1985 | Knapp . |
| 4,542,808 | 9/1985 | Lloyd, Jr. et al. . |
| 4,676,361 | 6/1987 | Heisler . |
| 4,703,858 | 11/1987 | Ueberreiter et al. . |
| 4,722,058 | 1/1988 | Nakayama et al. . |

FOREIGN PATENT DOCUMENTS 2459195 9/1981 France .

Primary Examiner—H. Grant Skaggs
Attorney, Agent, or Firm—Julie Blackburn

[57] ABSTRACT

An automatic distribution machine includes a plurality of bin modules, each bin module being adapted to dispense packages onto a conveyor belt or the like. The bin modules are removable and interchangeable, thereby facilitating replacement if one fails. A sorting operation performed by the machine is controlled by a computer, which communicates with the bin modules through a common data bus. Expansion of the sorting operation can be achieved by extending the data bus to additional bin modules.

28 Claims, 21 Drawing Sheets

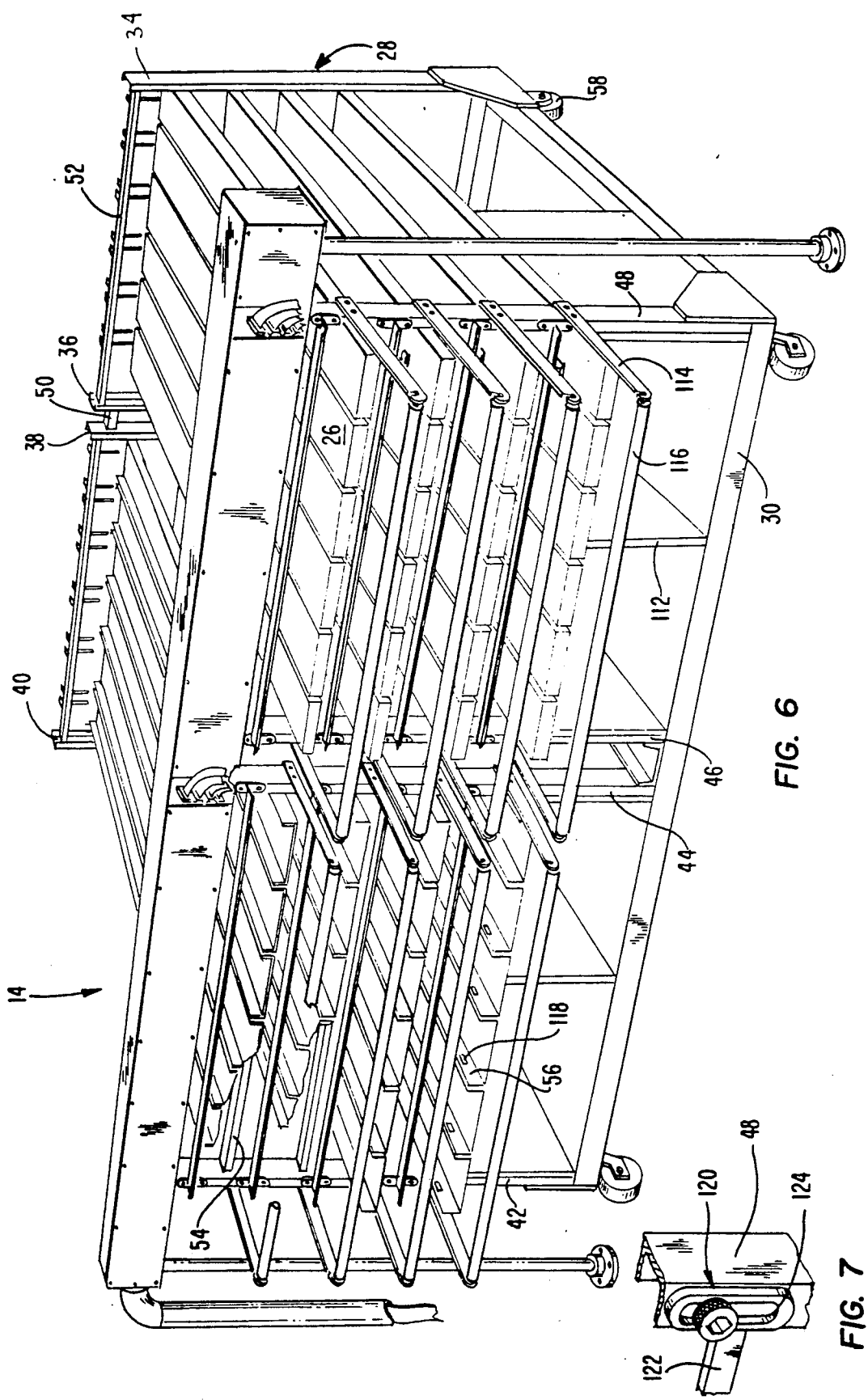

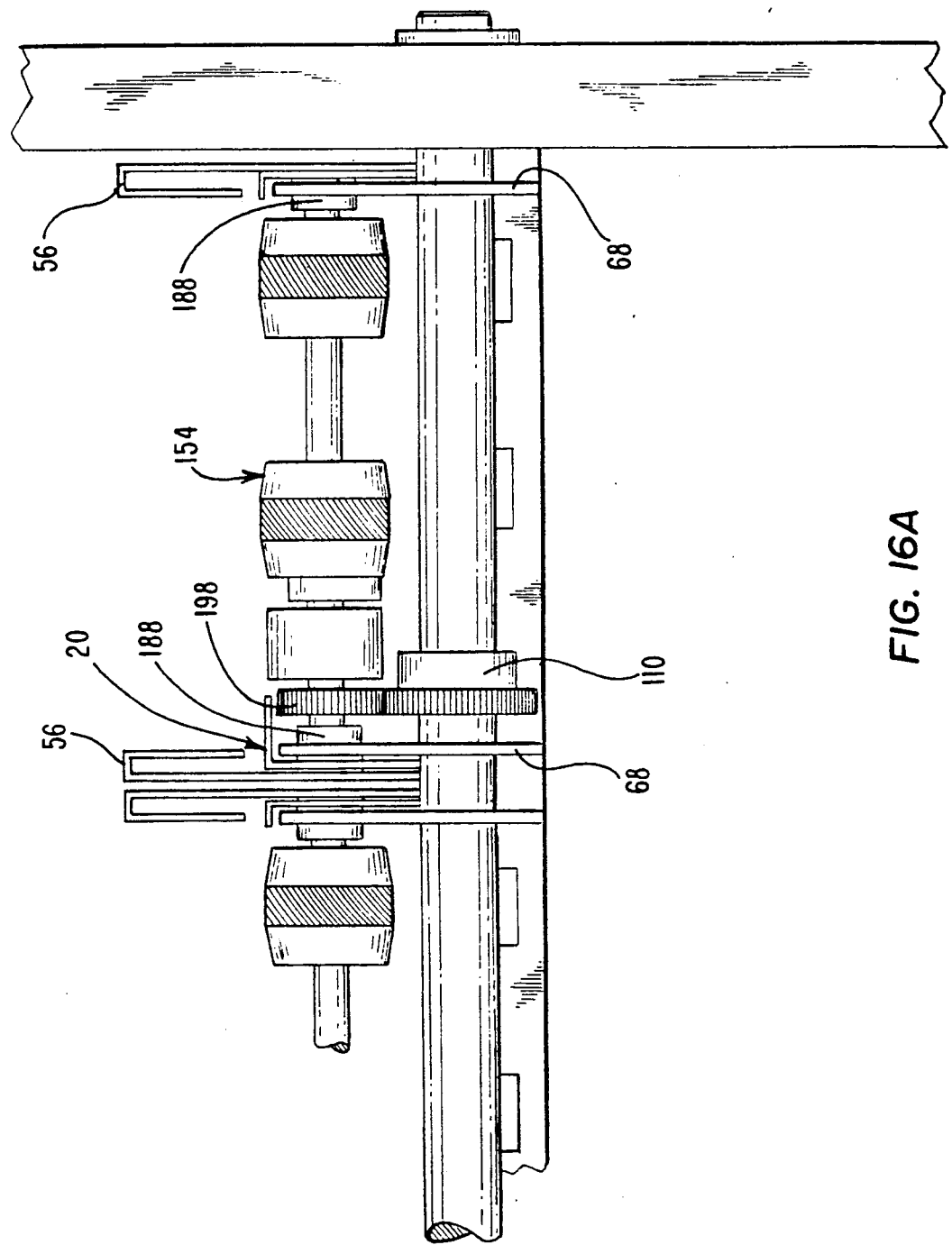

AUTOMATIC DISTRIBUTION MACHINE

FIELD OF THE INVENTION

The present invention relates to an apparatus and method for distributing packages, and, more particularly, to such apparatus employing a plurality of distribution modules that can be selectively actuated by a computer, and a method for distributing the same.

BACKGROUND OF THE INVENTION

During the late nineteen seventies and early eighties, computer technology revolutionized many manufacturing industries. In labor-intensive industries such as the automotive industry, computer-controlled equipment replaced people on the production lines. Such computercontrolled equipment performed complex manufacturing tasks quicker, cheaper and with greater precision than their human counterparts; therefore, manufacturers who modernized their factories reaped the benefits of substantially lower production cost. In the past, computer-controlled equipment has been especially advantageous to industries, such as the steel and automotive industries, which involve complex manufacturing tasks.

More recently, computer-controlled equipment has entered into some of the less complex stages of manufacturing, such as sorting packages An installation adapted to automatically sort packages can significantly reduce economic losses attributed to human error. To be feasible, however, the technology must be cost effective Sorting operations currently utilize complex robotic arms that transfer packages from their storage bins onto conveyor belts The process of individually sorting packages is slow and inefficient. The robots are expensive; they also require unique hardware and software which adds to the cost of the operation. In the event of mechanical failure, repair time is lengthy, resulting in a substantial economic loss to the company. Furthermore, expansion of the sorting operation is a formadable task; the difficulty lies with coordinating the operation of the robots. After balancing the savings attained by eliminating human error against the expenses attributed to these complex robots, the large initial outlay for modernization is not economically feasible.

SUMMARY OF THE INVENTION

The problems and disadvantages associated with sorting packages are overcome by the present invention which involves a new and improved apparatus and method. The apparatus is an Automatic Distribution Machine having a plurality of bin modules. Each bin module contains small packages which, with little wasted motion, are transferred onto a conveyor belt. The plurality of bin modules are driven by a common drive. Each bin module is connected to the common drive by engaging means. The engaging means allow the pin module to be detached from the common drive even while the common drive is operative. The modular design allows for a bin module to be quickly replaced if one fails. The bin modules are arranged vertically which makes for more efficient use of floor space.

The sorting operation is controlled by a computer. The computer communicates with a plurality of bin modules through a common data bus. Expansion of the sorting operation is facilitated by extending the data bus to additional bin modules. The method behind the involves polling the bin modules in groups of sixteen; as a result a plurality of bin modules can be commanded simultaneously. Since a personal computer can be used, instruction, hardware and software are inexpensive and readily available.

BRIEF DESCRIPTION OF THE DRAWINGS

For a better understanding of the present invention, reference is made to the following detailed description considered in connection with the accompanying figures, in which:

FIG. 6 is a perspective view of the rear of the cluster which forms a part of the Automatic Distribution Machine illustrated in FIG. 1;

FIG. 7 is a detailed view of a box stop which forms a part of the cluster illustrated in FIG. 6;

FIG. 16a is a detailed front view of a bin module engaged with the primary drive of the cluster illustrated in FIG. 1;

DESCRIPTION OF THE EXEMPLARY EMBODIMENTS

In an industry such as cosmetics, retailers place orders for products contained in small packages. In the cosmetics industry, each package typically contains one type of cosmetic product. A typical order comprises a wide array of products, all in different quantities. The products in each order are assembled and packaged in a factory or warehouse before being shipped to the retailer. Although the present invention is applicable to many different types of sorting operations, it is especially suitable for use as a machine for automatically sorting and distributing small packages Accordingly, the present invention will be described in connection with an automatic distribution machine for sorting small packages.

Figure 1:
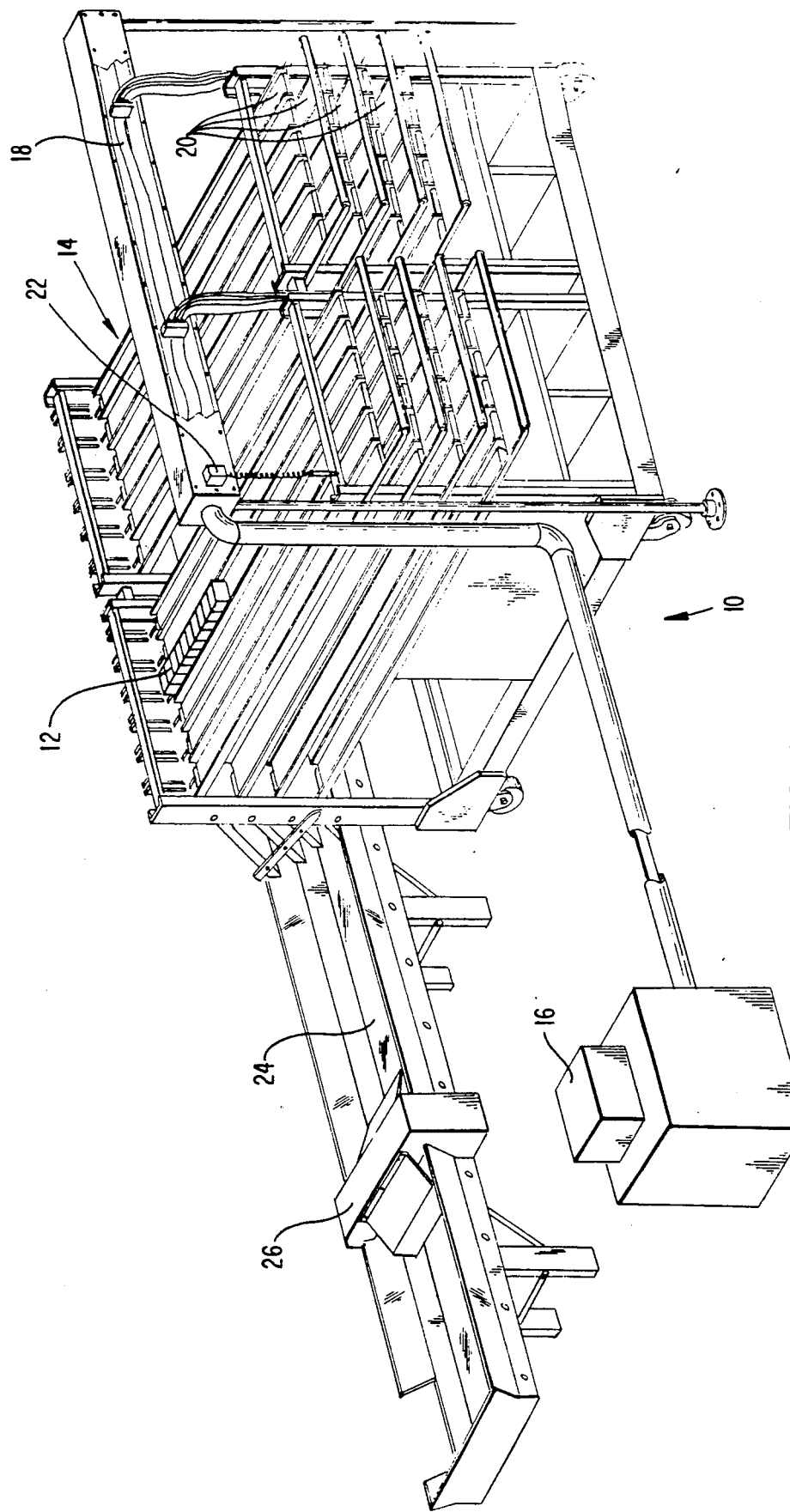
FIG. 1 is a perspective view of an Automatic Distribution Machine adapted to automatically distribute small packages, and constructed in accordance with one exemplary embodiment of the present invention.

Referring to FIG. 1, there is shown an Automatic Distribution Machine 10 adapted for sorting small packages 12. The Automatic Distribution Machine 10 includes a cluster 14, host computer 16, and data bus 18. The cluster 14 includes a plurality of bin modules 20. Each bin module 20 stores packages 12 containing the products. Only one type of product is a associated with a bin module 20. A unique address is assigned to each bin module 20. The host computer 16 correlates each unique address to the product. Therefore, to command a bin module 20 to distribute a particular product, the host computer 16 sends a command to that unique address via the data bus 18. The bin module 20 having that unique address responds by distributing its associated package 12 As many as sixteen bin modules 20 can be commanded simultaneously.

The data bus 18 provides a path of communication between the cluster 14 and host computer 16. Each bin module 20 is connected to the data bus 18. Input peripherals such as a mainframe (not shown) or a laser scanner 22 send orders to the host computer 16. Alternately, an operator can input orders directly through the host computer. An operator does not have to be present during operation of the Automatic Distribution Machine 10. Upon receipt of an order, the host computer 16 distributes the corresponding products by sending the appropriate sequence of commands to different addresses. Once the bin modules 20 receive their commands, they distribute their associated packages 12, thereby filling the order. The dispensed packages 12 are transported to a packing area (not shown) by such means as a conveyor belt 24. En route, a pneumatically-controlled gate 26 delays the distributed packages 12 until they assemble into a complete order. Once the order is assembled, the gate 26 opens and the packages 12 advance to the packing area. The gate 26 is also controlled by the host computer 16 In an alternate mode of operation, at least two bin modules 20 can share the same address. If for example a product is distributed in pairs, two bin modules 20 operating simultaneously can distribute the product twice as fast as a single bin module 20.

Figure 2:
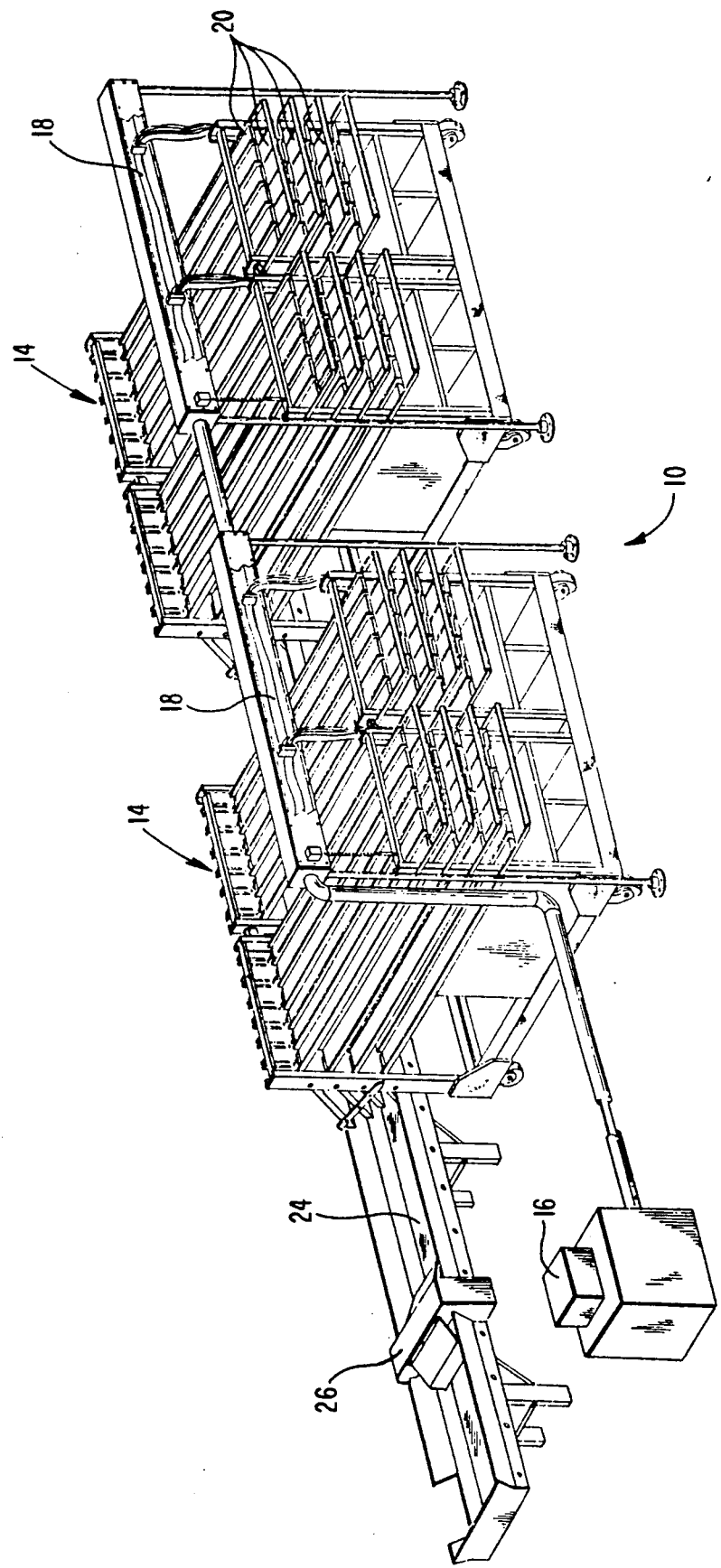
FIG. 2 is a perspective view of the Automatic Distribution Machine constructed in accordance with a second exemplary embodiment of the present invention.

Referring to FIG. 2, the Automatic Distribution Machine 10 employs a modular design which facilitates expansion of the sorting operation. The capacity of the Automatic Distribution Machine 10 is increased by adding additional clusters 14. With the addition of each cluster 14, the new bin modules 20 increase the capacity of the Automatic Distribution Machine 10 for distributing new products. Accordingly, the new bin modules 20 have corresponding unique addresses To add a cluster 14 to the sorting operation, each bin module 20 therein is connected to the data bus 18. Then the host computer 16 is updated to correlate the new addresses with the new products.

Figure 3:
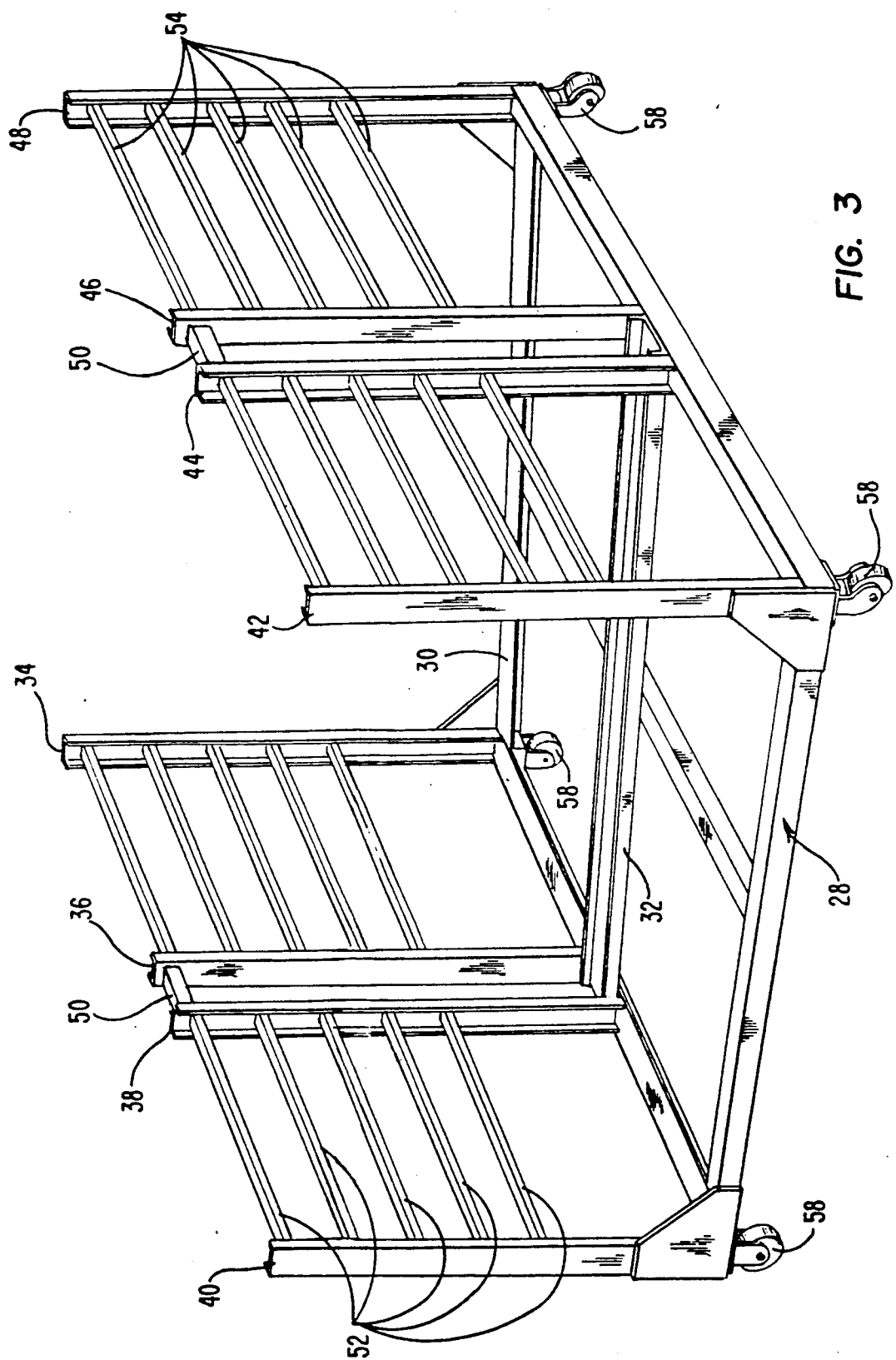
FIG. 3 is a perspective view of a cluster frame which forms a part of the cluster illustrated in FIG. 1.

Referring now to FIG. 3, each cluster 14 has a frame 28 which detachably houses the bin modules. The frame 28 comprises a horizontal base 30, a channel 32, four vertical front posts 34, 36, 38 and 40 and four vertical rear posts 42, 44, 46 and 48. The base 30 has a rectangular shape It can be formed from angle brackets or a solid sheet of metal. The channel 32 has C-shape in transverse cross-section; it connects to the base 30 such that the base 30 is bisected into a left half and a right half. Each post 34, 36, 38, 40, 42, 44, 46 and 48 has a block C-shape in transverse cross-section. Two front posts 34 and 36 and two rear posts 46 and 48 attach at right angles to the left half of the base 30, thereby forming a left half of the frame 28. Two front posts 38 and 40 and two rear posts 42 and 44 attach at right angles to the right half of the base 30, thereby forming a right half of the frame 28. Two spacers 50 attach to the middle front posts 36 and 38 and rear posts 44 and 46 respectively. Since the right and left halves of the frame 28 are identical in construction, only the left half of the frame 28 will be described in connection with FIG. 3.

In the upper portion of the left half of the frame 28, five front cross links 52 rigidly attach to the front posts 34 and 36 and five rear cross links 54 rigidly attach to the rear posts 46 and 48. The upper surfaces of the four lowermost pairs of front and rear cross links 52 and 54 cooperate to form four rows. Module houses 56 rest on pairs of front and rear cross links 52 and 54. Each module house 56, having essentially a block U-shape in transverse cross-section, provides a detachable housing for a bin module 20 (see FIG. 15). The length of the module house 56 is substantially greater than its width. Six module houses 56 rest side by side per row per half of the frame 28. The frame 28 can be made of aluminum or galvanized steel. All its members are rigidly fastened by such means as welds, bolts or rivets. The frame 28 is mobile: two castors 58 fixedly attach to the front corners of the base 30, and two castors 58 pivotably attach to the rear corners of the base 30.

Figure 4:
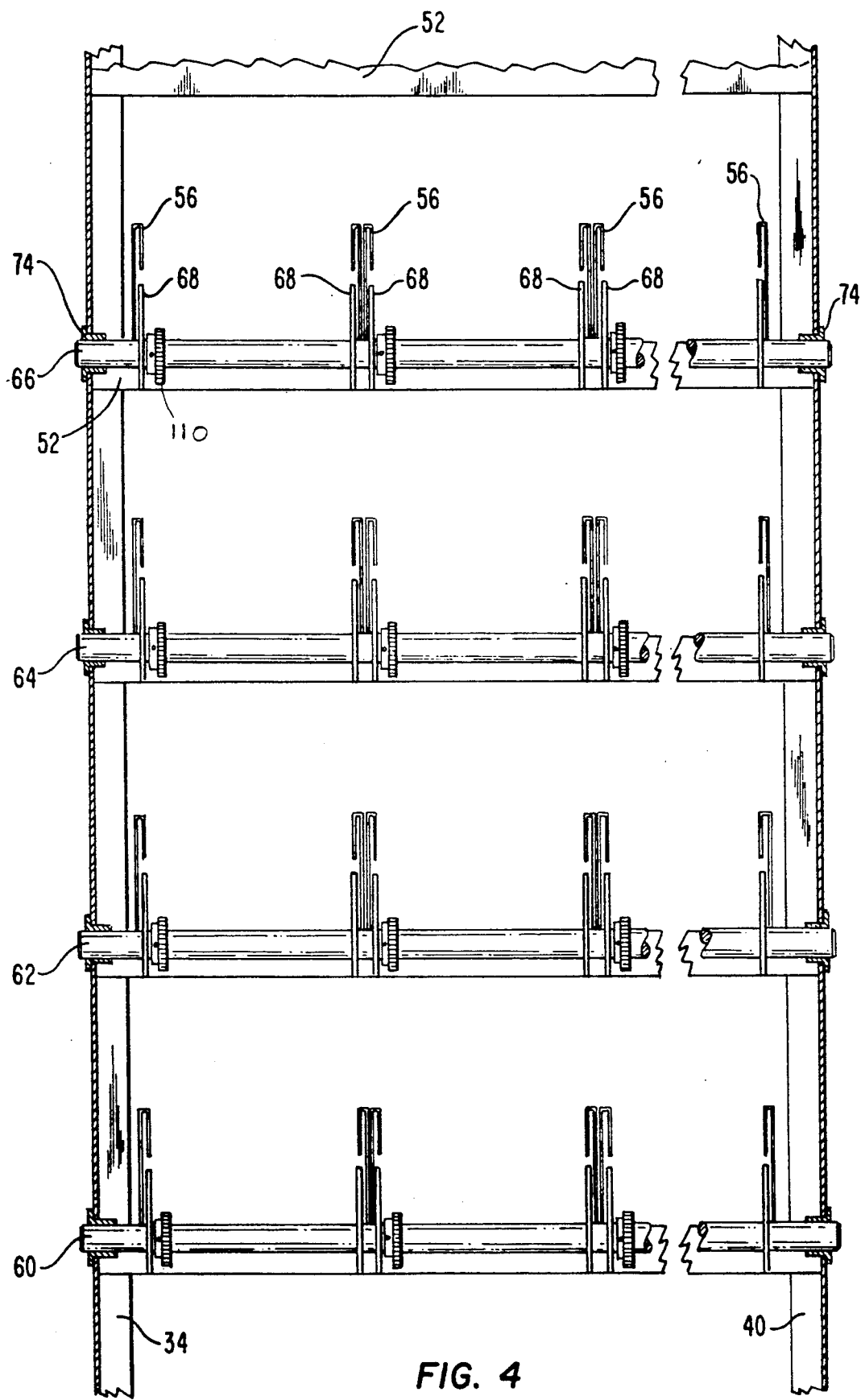
FIG. 4 is a detailed view of the periphery of the drive assembly which forms a part of the cluster illustrated in FIG. 1.
Figure 5:
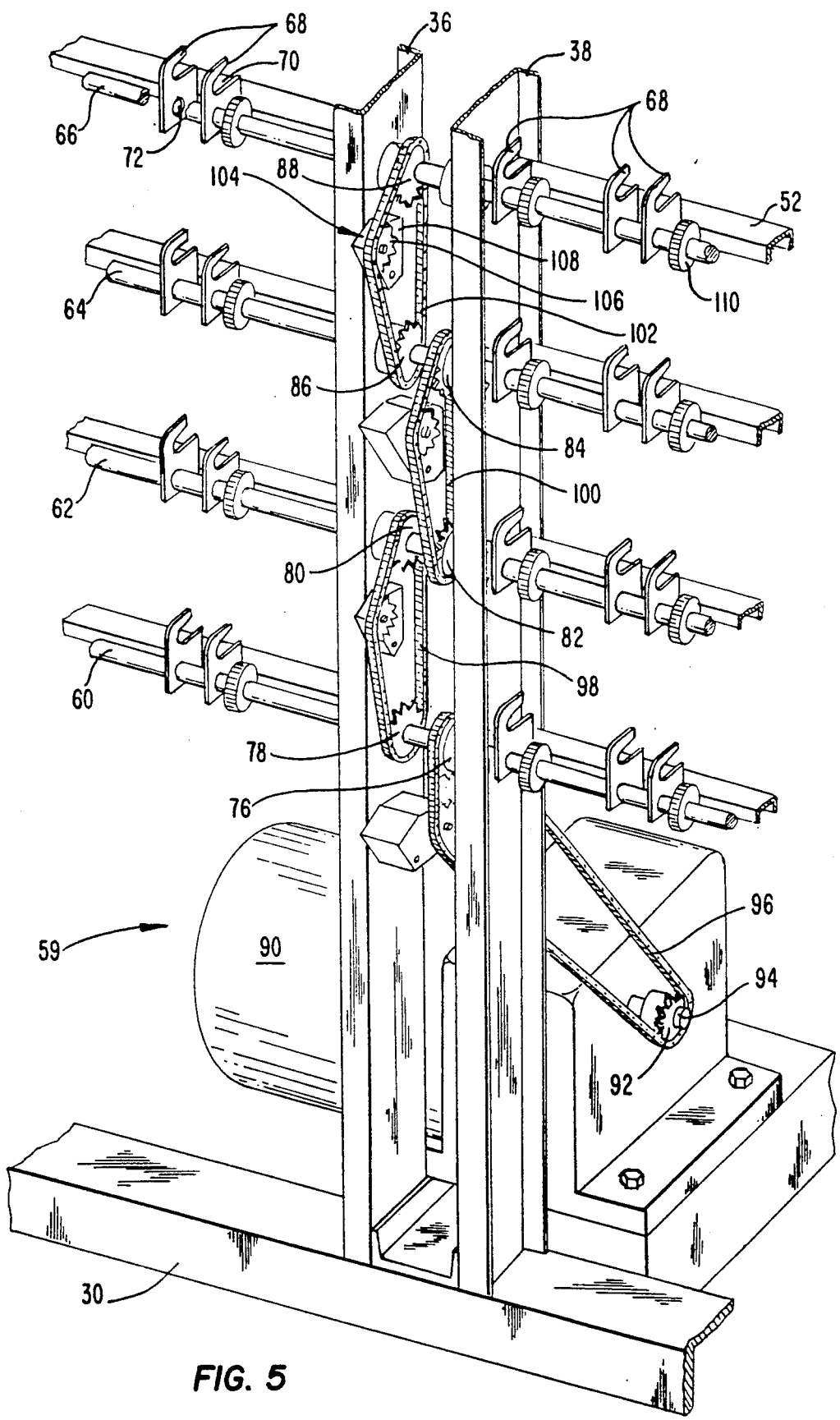
FIG. 5 is another detailed view of the drive assembly which forms part of the cluster illustrated in FIG. 1.

Referring now to FIGS. 4-5, a drive assembly 59 is located at the front of the cluster 14 The front posts 34, 36, 38 and 40 have four axle holes (not shown) corresponding to first, second, third and fourth solid axles 60, 62, 64 and 66, each axle extending from post 34 to 40. Each axle hole is coincident with a row of module houses 56. Bracket 68 is a planar member having a notch 70 and an axle hole 72. For each module house 56, two brackets 68 are positioned adjacent to the respective sidewalls thereof and attached rigidly at right angles to the front cross link 52. The notch 70 is positioned above the axle hole 72. The exact position and function of the bracket 68 will become more apparent with a description of the bin module 20 in relation to the module house 56. The respective axle holes 72 in a row of brackets 68 cooperate with the axle holes in the front posts 34, 36, 38 and 40 to form a throughway. Four throughways are formed, each corresponding to an axle for a row of module houses 56. Oil impregnated bearings 74 mount within the axle holes 72 in the brackets 68 and the holes within the posts 34, 36, 38 and 40. The bearing 74 can be a conventional type, such as roller, ball or sleeve bearing. The four solid axles 60, 62, 64 and 66 extends from post 34 to post 40 through the rows of bearings 74 of their associated throughway. Thus, each axle 60, 62, 64 and 66 is coincident with a row of module houses 56.

Between the middle posts 36 and 38, a first input sprocket 76 and a first output sprocket 78 are attached to the first axle 60, a second input sprocket 80 and a second output sprocket 82 are attached to the second axle 62, a third input sprocket 84 and a third output sprocket 86 are attached to the third axle 64, and a fourth input sprocket 88 is attached to the fourth axle 66. All sprockets 76, 78, 80, 82, 84, 86 and 88 are attached to their corresponding axles 60, 62, 64 and 66 by set screws and keys (not shown). An electric motor 90 having a drive gear 92 and a motor shaft 94 is attached to the base 30. The drive gear 92 is rigidly attached to the end of the motor shaft 94 A first chain 96 connects the drive gear 92 to the first input sprocket 76; a second chain 98 connects the first output sprocket 78 to the second input sprocket 80; a third chain 100 connects second output sprocket 82 to the third input sprocket 84; and a fourth chain 102 connects the third output sprocket 86 to the fourth input sprocket 88. Four chain tensioners 104, each having a chain tensioner gear 106 and a tensioner body 108, remove the slack from the chains 96, 98, 100, 102. The chain tensioner gear 106 is rotatably mounted to the tensioner body 108. Each chain tensioner gear 106 communicates with its respective chain 96, 98, 100, 102. The tensioner body 108 is adjustably mounted on the interior of a middle front post 36 or 38 and is of sufficient thickness to allow the corresponding chain tensioner gear 96 to communicate with its corresponding chain 96, 98, 100 or 102.

Primary spur gears 110 are attached to each axle 60, 62, 64, 66 by set screws 134. Each spur gear 110 corresponds to a module house 56. The positions of the primary spur gears 110 in relation to their associated bin modules will be discussed later. The motor 90 causes the first axle 60 to rotate; the first axle 60 causes the second axle 62 to rotate; the second axle 62 causes the third axle 64 to rotate; and the third axle 64 causes the fourth axle 66 to rotate. Each row of spur gears 110 rotates conjointly with their corresponding axles 60, 62, 64 and 66.

Referring now to the rear of the cluster 14 as illustrated in FIG. 6, two storage boxes 112 are shown resting atop their respective halves of the base 30. Each storage box 112 can be made of wood or any other suitable material. Coincident with each row of module houses 56 on the left side of the base 30, two shelf brackets 114 are rigidly attached at right angles to posts 46 and 48 respectively. Coincident with each row of module houses 56 on the right side of the base 30, two shelf brackets 114 rigidly attach at right angles to posts 42 and 44 respectively. Each shelf bracket 114 has a hooked end. A rod 116 extends horizontally through the hooked ends of a pair of shelf brackets 114 A piece of wood (not shown) can be placed atop the rod 116 and associated shelf brackets 114 thereby forming a shelf. A slotted, spring-loaded pin 114 is located at the rear of a sidewall of the module house 56. Its function will be discussed later in connection with fastening the bin module 20 to the module house 56.

With reference to FIG. 7, a box stop 120 has a horizontal member 122 with vertically slotted ends 124. The slotted ends 124 allow for vertical adjustment of the box stop 120. Each box stop 120 on the left side of the frame 28 is attached to rear posts 46 and 48 above each row of module houses 56. Each box stop 120 on the right side of the frame 28 is attached to rear posts 42 and 44 above each row of module houses 56. The box stop 120 assists in loading packages onto the bin modules 20.

Figure 8:
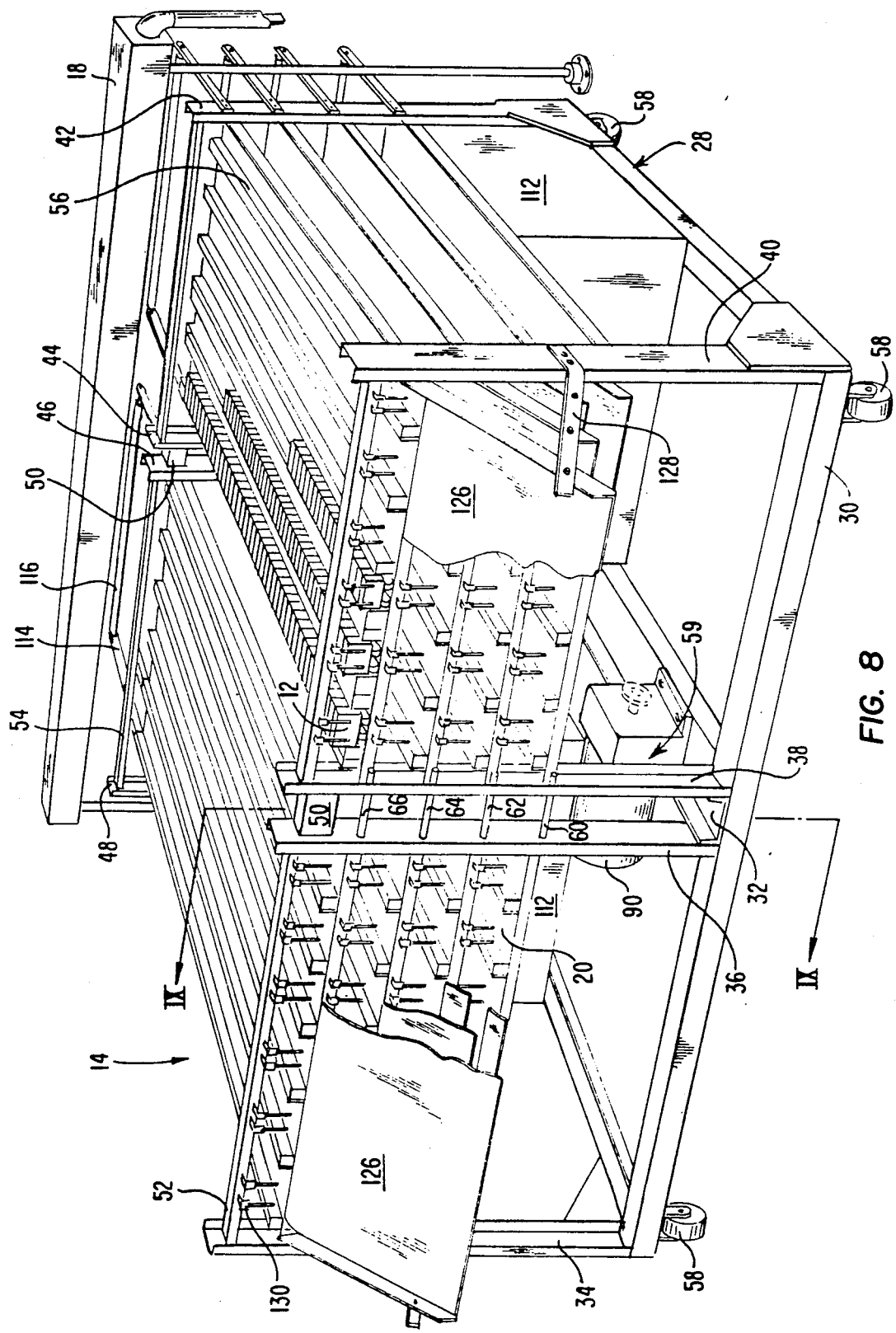
FIG. 8 is a perspective view of the front of the cluster which forms a part of the Automatic Distribution Machine illustrated in FIG. 1.
Figure 9:
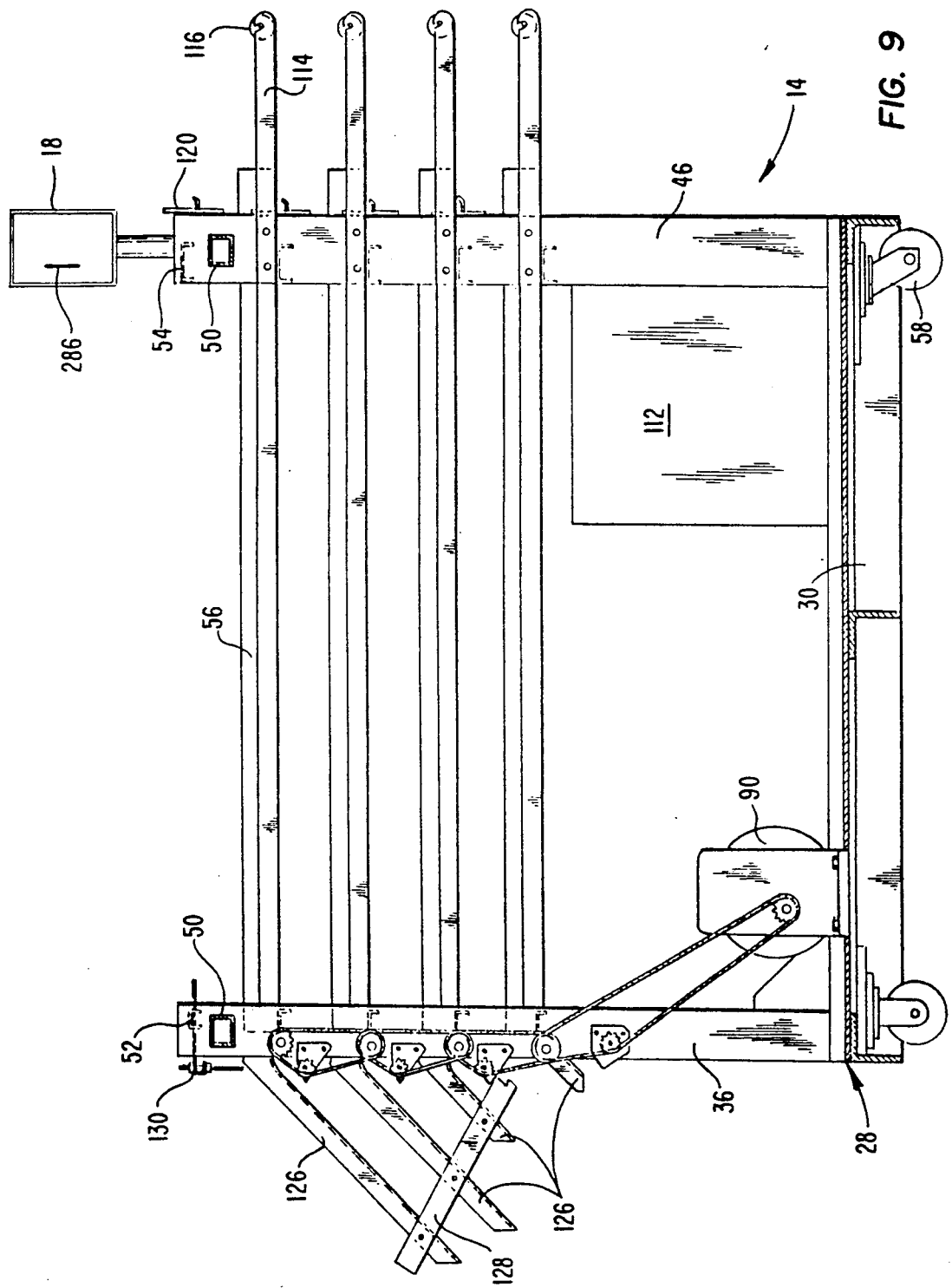
FIG. 9 is a cross-sectional view of the cluster illustrated in FIG. 8, taken along the section line IX—IX in FIG. 8 and looking in the direction of the arrows.

Referring now to the front and side views of the cluster 14 as illustrated in FIGS. 8 and 9, respectively, each cluster 14 has two sets of four chutes 126. Each chute 126 corresponds to a row of module houses 56 on either half of the frame 28, and is located in front of its corresponding row and angled downward therefrom in order to provide a path from each module houses 56 in that row to the conveyor belt 24 (see FIG. 1). On the left half of the frame 28, four chutes 126 are rigidly attached to front posts 34 and 36. On the right half of the frame 28, four chutes 126 are rigidly attached to front posts 38 and 40. To stabilize the three uppermost chutes 126, chute support brackets 128 are rigidly attached to both sides thereof. Flaps (not shown) made of plastic, rubber or fabric cover the front of each chute 126. The flaps slow the descent of the dispensed package.

Two pairs of stop spring assemblies 130 correspond to each module house 56 and are slidably attached thereabove to a front cross link 52. The two assemblies 130 cooperate to prevent a package 12, teetering at the edge of the bin module 20, from falling down the chute 126.

Figure 10:
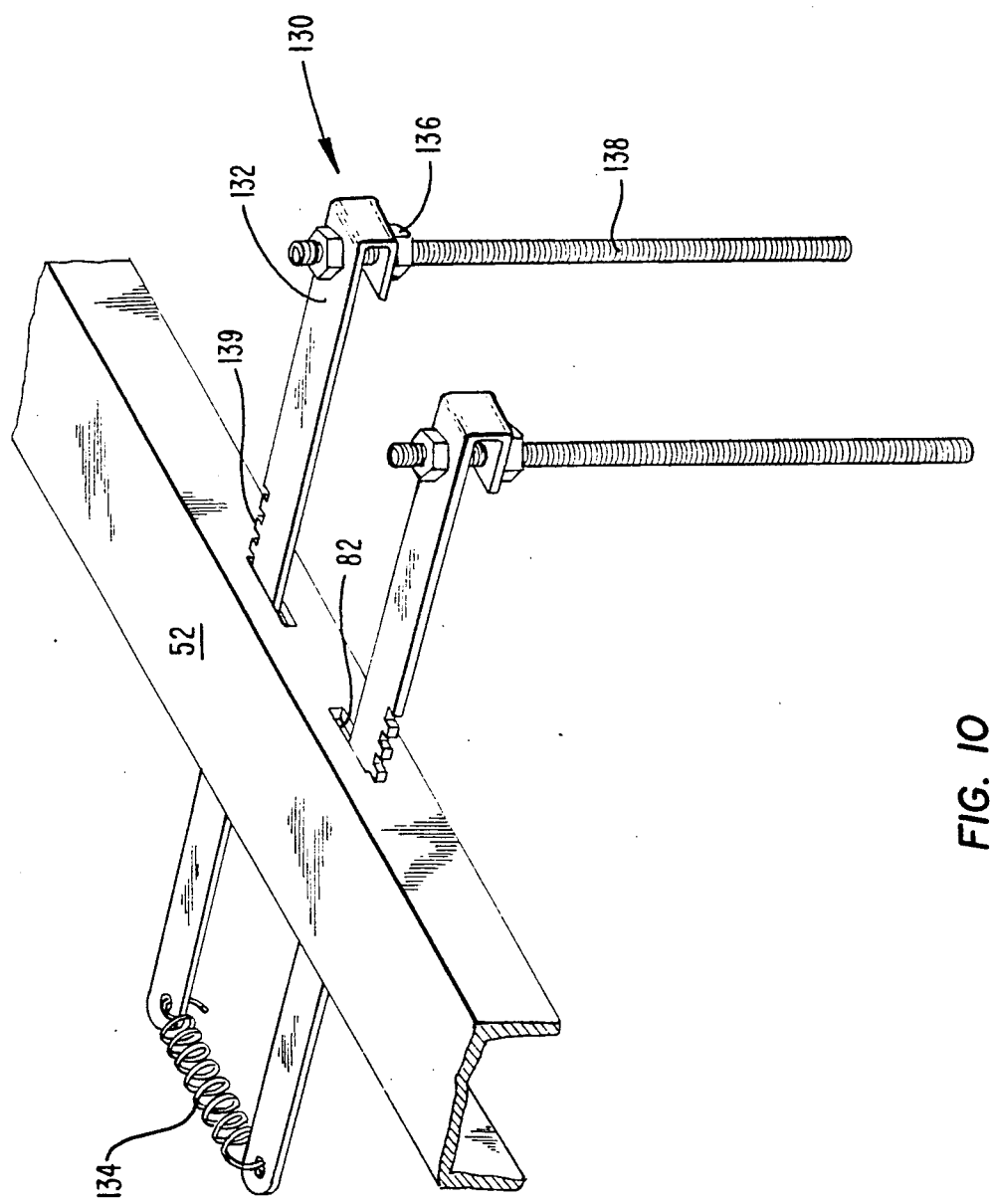
FIG. 10 is a detailed view of a spring stop assembly which forms a part of the cluster illustrated in FIG. 9.

With reference to FIG. 10, each stop spring assembly 130 comprises an arm 132, adjusting screw 136, and stop spring 138. The arm 132 has notches 139 at its middle and apertures at opposite ends. One aperture is threaded internally. The adjusting screw 136 engages with the internally threaded aperture. The stop spring 138 is rigidly attached to the threaded end of the adjusting screw 136 such that it is perpendicular to the arm 132. A transverse slot 140 located in the front cross link 52 slidably receives the arm 132. The arm 132 is positioned in the slot 140 such that it extends horizontally over the module house 56 with the stop spring 138 extending downward (see FIG. 8).

The notches 139 allow for lateral motion of the arm 132 within the slot 140. The width of each notch 139 is greater than the thickness of a wall of the front cross link 52. Thus, the arm can slide longitudinally along the front cross link 52, or laterally thereto, for interlocking the notch 134 with the front cross link 52. A pair of cooperating arms 132 is positioned within the slots 140 with their notches 139 on exterior sides. A spring 132 is positioned between the two arms 132, and attached to the respective unthreaded apertures thereof. The length of the spring 134, when unbiased, is less than the center-line distance between the two arms 132. Normally, the arms 132 would be parallel when positioned within the slots 140; however, the biased spring 134 forces the ends together. The respective slots 140, acting as fulcrums, force the front of the arms 132 apart, thereby forcibly engaging the respective notches 139 with the front cross link 52. As a result, the arms 132 are locked in place.

The cooperating stop spring assemblies 130 are adjusted first by pinching the front of the arms 132 together, thus stretching the spring 134 and disengaging the notches 139 from the front cross link 52. Next the arms 132 are slid longitudinally within their slot 140 until the stop springs 138 extend to the edge of the bin module frame 142. Then the arms 132 are released. The spring 134, using the slots 140 as fulcrums, forces the arms 132 apart, thus engaging the notches 139 with the front cross link 52, and thereby locking the arms 132 in place. Finally, the respective adjusting screws 136 are turned until the stop springs 138 contact the upper region of the first package at the end of the bin module 20.

Figure 11:
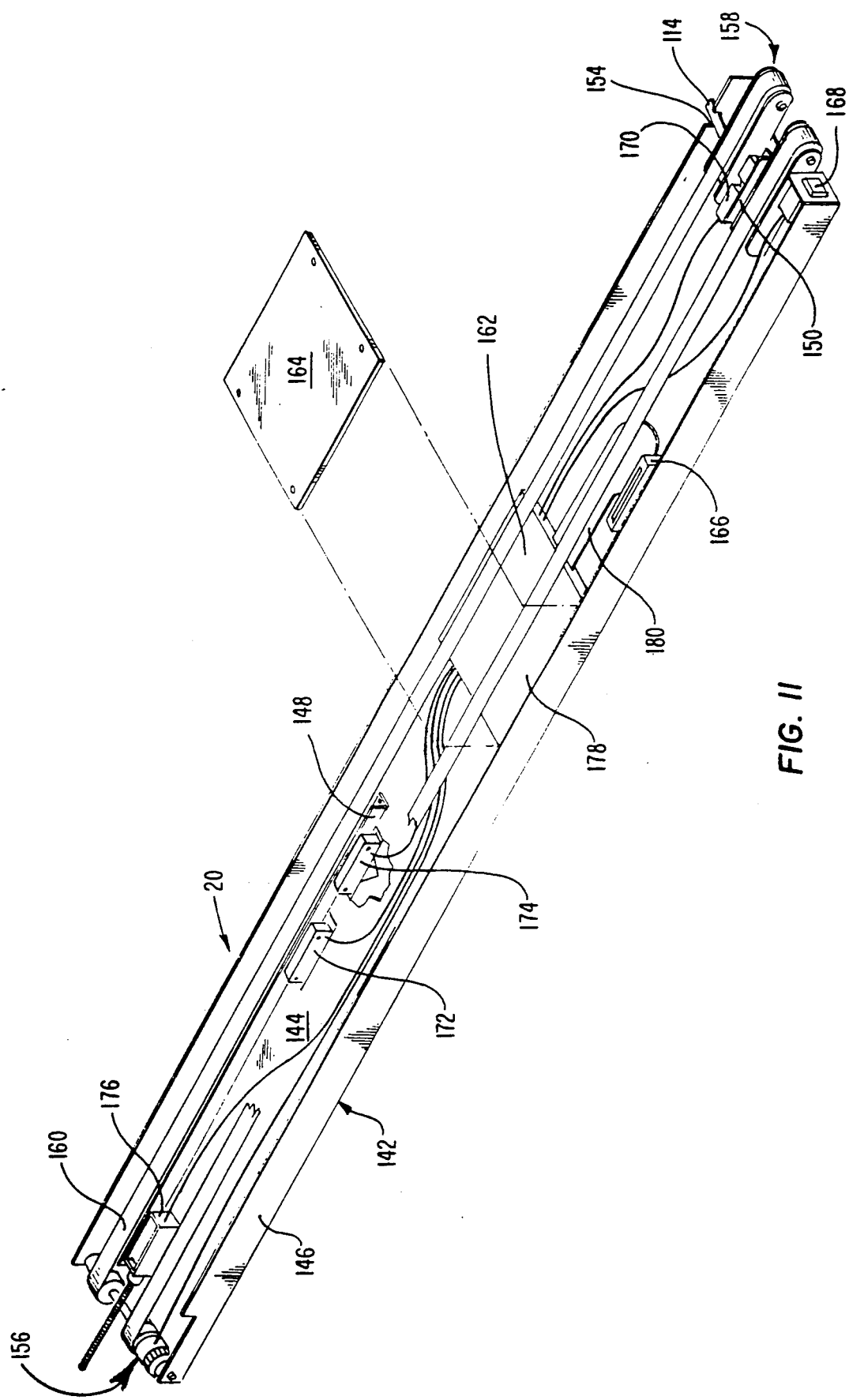
FIG. 11 is a perspective view of the bottom of a bin module which forms a part of the cluster illustrated in FIG. 1.

Referring now to FIG. 11, the bin module 20 has a module chassis 142 including a planar base 144, two sidewalls 146, an elongated first module bracket 148, and a substantially shorter second module bracket 150. The base 144 is rectangular in shape with its length substantially greater than its width. The length and width of the base 144 correspond to the dimensions of the module house 56. Two rectangular middle slots 151 and 152 are located roughly at the middle of the base 144, and a rectangular rear slot 153 is located at the rear of the base (see FIG. 15). All three slots 151, 152 and 153 are positioned along the anterior-posterior axis of the base 144. The sidewalls 146 are formed at right angles along the length of the base 144 giving the bin module 20 a block U-shape in transverse cross section. A square notch 154 is located at the rear of one sidewall 146. The function of the notch 154 will be described in connection with mounting the bin module 20 onto the frame 28 (see FIG. 15). Both module brackets 148 and 150 have an L-shape in transverse cross-section and are rigidly attached to the underside of the base 144. The first module bracket 148 extends from the front end of the base 144 slightly beyond the two middle slots 151 and 152. The second module bracket 150 is located at the rear of the base 144.

The bin module 20 also includes a clutch assembly 156 which is attached to the front underside of the chassis 142, and two belt tensioners 158 which are attached to the rear underside of the chassis 142. Two module belts 160 cooperate with the clutch assembly 156 and belt tensioners 158 to transport the packages to the front of the bin module 20. Two belts 160 are preferred over one since a single-belt system tend to rotate the packages during distribution. The bin module 20 also includes a bin interface module 162 and cover 164, a 34-pin female bus connector 166, a service switch 168, first, second and third limit switch assemblies 170, 172, 174, and a counter switch 176, all of which are attached to the underside of the module chassis 142.

The pin interface module 162 includes a printed circuit board 178 and electronic components (not shown) mounted thereto. The printed circuit board 178 is a planar member, employing conventional printed circuit material such as glass or cloth filled epoxy boards, Teflon, or a paper base phenolic composition. Many materials can be employed for the printed circuit board 178 as are presently used to fabricate conventional printed circuits. Four cylindrical standoffs (not shown) rigidly connect the printed circuit board 178 to the base 144 of the bin module 20 with the electronic components mounted thereon facing the base 144. The standoffs isolate the printed circuit board 178 from the base which insulates the board 178 from the chassis 142 and allows for better air circulation therebetween for dissipating heat from the electronic components. A planar, plastic cover 164 having a geometric shape similar to that of the printed circuit board 178 mounts is positioned atop the printed circuit board 178 and attached to the four standoffs. The cover 164 prevents static electricity, generated by the module belts 160, from damaging the electronic components. Two cylindrical standoffs (not shown) rigidly attach the 34-pin female bus connector 166 to the base 144. A 34-line ribbon 180 electrically connects the bus connector 166 to the printed circuit board 178.

Figure 12:
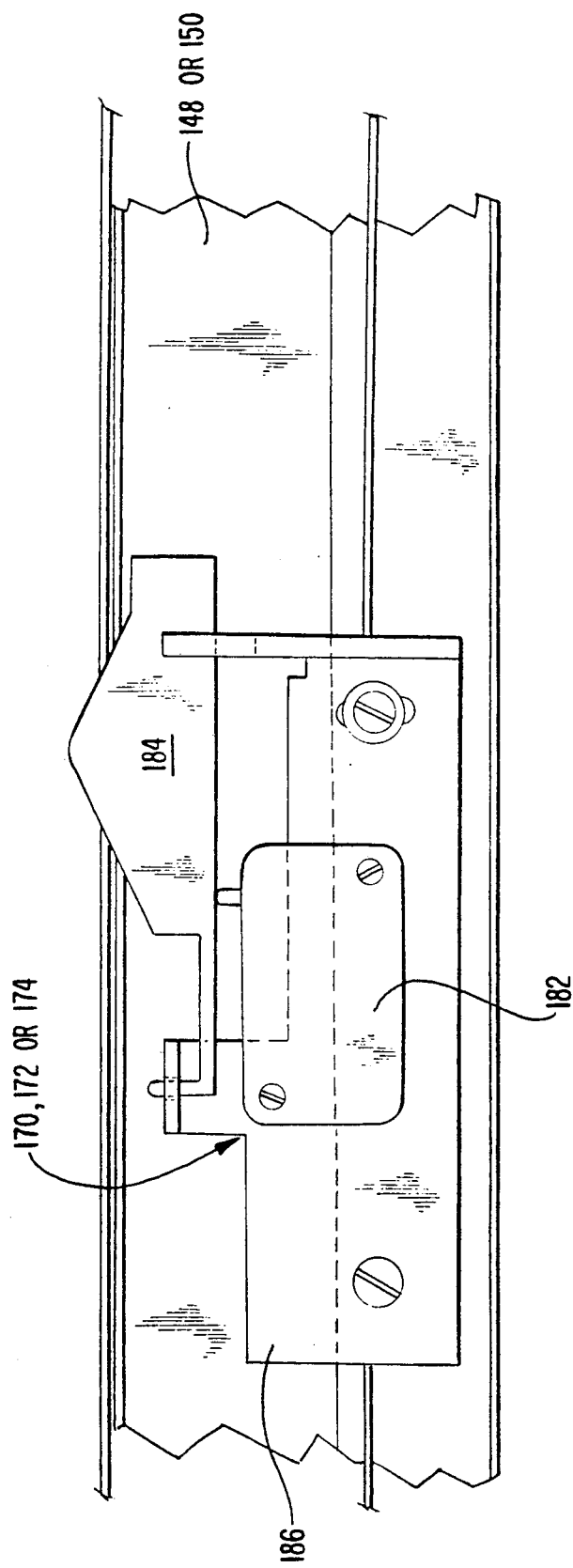
FIG. 12 is a detailed view of a limit switch assembly which forms a part of the bin module illustrated in FIG. 11.

Referring now to FIG. 12, each limit switch assembly 170, 172 and 174 includes a spring-biased, normally closed micro-switch 182, a lever 184, and switch bracket 186. The lever 184 is slidably attached to the switch bracket 186, and the micro-switch 182 is positioned therein such that when the lever 184 is depressed, the micro-switch 182 is opened. Two switch assemblies 172 and 174 are designated "reload" switches; their respective switch brackets 1886 are attached to the first module bracket 148 with their associated levers 184 protruding through their respective middle slots 151 and 152 (see FIG. 15). One switch assembly 170 is designated "load" switch; its switch bracket 186 is attached to the second module bracket 150 with its associated lever 184 protruding through the rear slot 153 in the base 144 (see FIG. 15).

Figure 13:
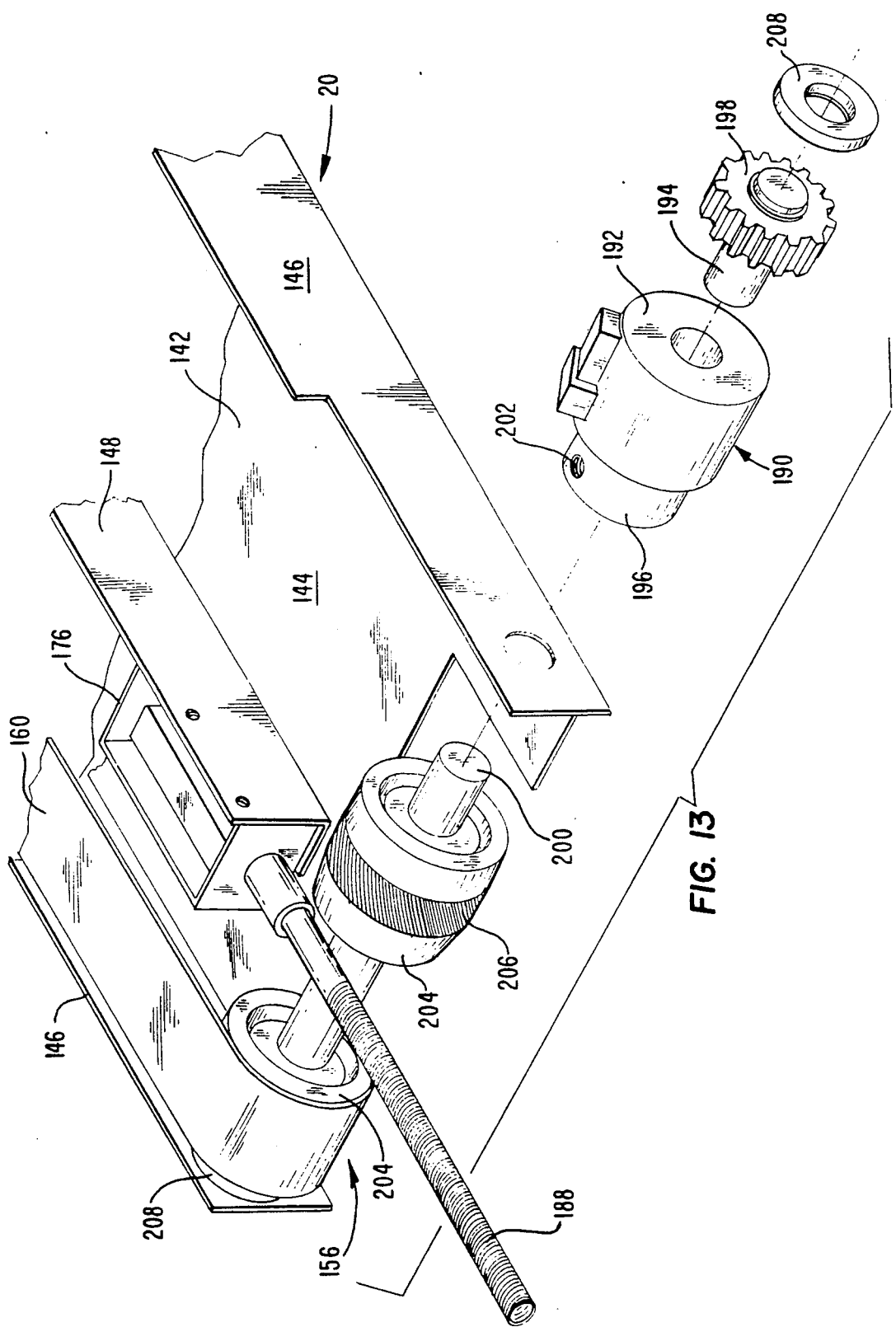
FIG. 13 is an exploded view of the front of the bin module illustrated in FIG. 11.

Referring now to the front of the bin module 20 as illustrated in FIG. 13, the counter switch 176 is spring-biased and normally closed. A counter lever 188, which can be a stiff spring, attaches to the counter switch 176. The counter switch 176 is rigidly attached to the first module bracket 148 with the counter lever 188 extending parallel to the anterior-posterior axis of the base 144 and beyond the front of the bin module 20. When the counter lever 188 is at rest, the counter switch 176 is closed; when the counter lever 188 is depressed downwards, the counter switch 176 is open. The clutch assembly 156 is the coupling means through which the drive assembly 59 enables the pin module 20.

The clutch assembly 156 includes an electromagnetic clutch 190 which can be a conventional type such as the one manufactured and sold by RPM Industries. The electromagnetic clutch 190 has a clutch housing 192 that is rigidly attached to the base 144. An input shaft 194 is rotatably mounted to one end of the clutch housing 192; an output shaft 196 is rotatably mounted to the other end. When the electromagnetic clutch 190 is actuated, the output shaft 196 is electromagnetically engaged with the input shaft 194 for conjoint rotation therewith. A secondary spur gear 198 is pressure-fit onto the input shaft 194. The secondary spur gear 198 meshes with the primary spur gear 110 of the drive assembly 59 as will be shown and described in connection with FIG. 16 The output shaft 196 has a bore extending partially therethrough A pulley shaft 200 is received by the bore of the output shaft 196 and attached thereto by a set screw 202, which allows the two shafts 196 and 200 to rotate conjointly. Two pulleys 204 are rigidly attached to the respective ends of the pulley shaft 200. A knurling 206 is formed on the surface of each pulley 204 to obtain a better grip on the associated module belt 160 Bearings 208 are fixedly attached to their respective sidewalls and aligned with the rotary axis of the input shaft 194—output shaft 196—pulley shaft 200 The pulley shaft 200 extends into one bearing 208; the input shaft 194 extends through another bearing 208. Both bearings 208 can be a conventional type, such as roller, ball or sleeve bearings The primary drive 59 continuously rotates the input shaft 194. When the electromagnetic clutch 190 is engaged, the input shaft 194, output shaft 196 and pulley shaft 200 rotate conjointly. As a result, the pulleys 204 rotate and advance the module belts 160.

Figure 14:
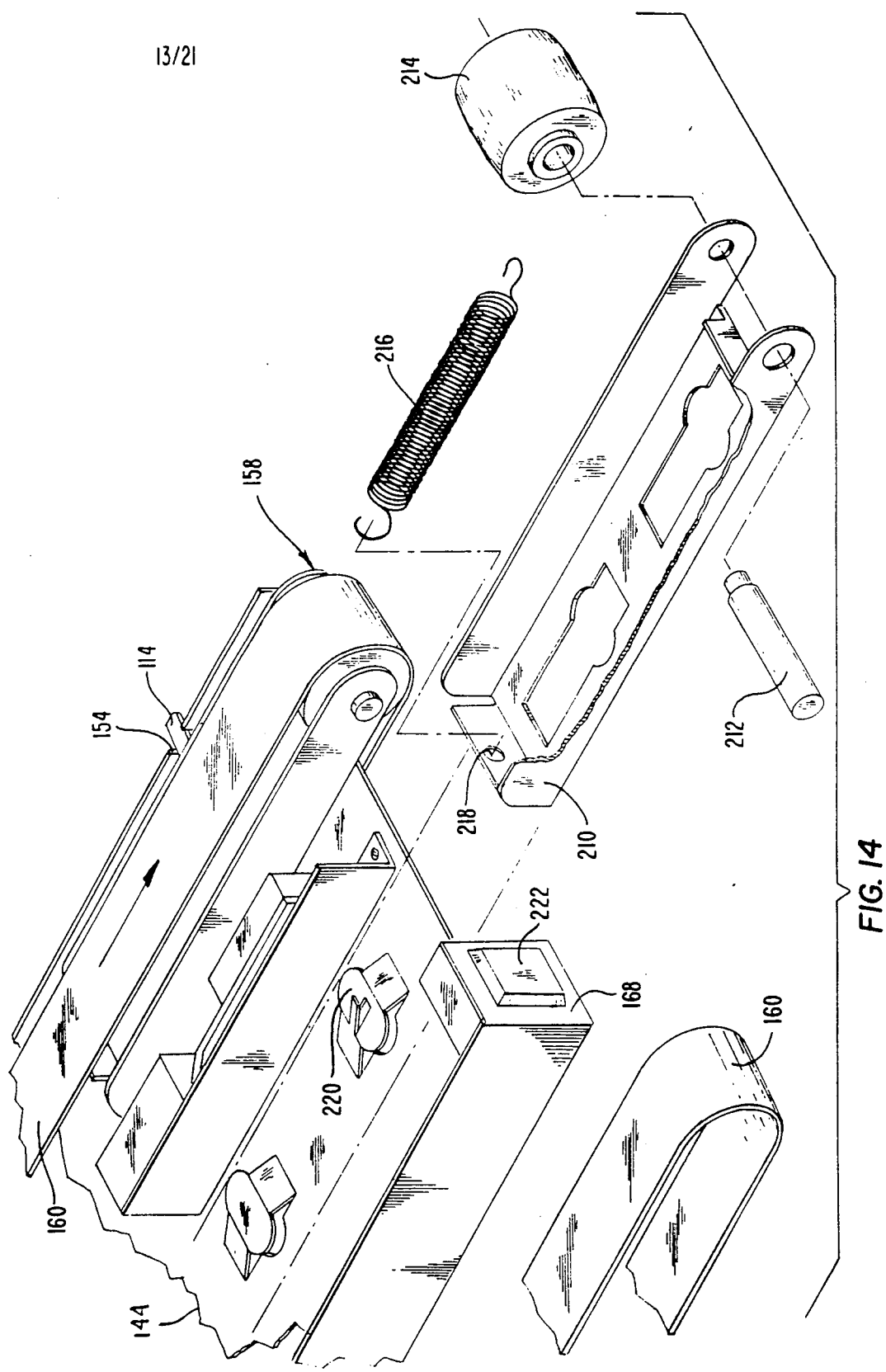
FIG. 14 is an exploded view of the rear of the bin module illustrated in FIG. 11.

Referring now to FIG. 14, the two belt tensioners 158 keep their associated module belts 160 taut. Each belt tensioner 158 comprises a tensioner housing 210, a solid axle 212, a smooth-surfaced pulley 214, and an extension spring 216. The tensioner housing 210 is mounted to the bin module base 144 such that it slides along the anterior-posterior axis thereof. The axle 212 extends transversely through the rear of the tensioner housing 210. The pulley 214 is attached to the axle 212 for rotation thereabout. An aperture 218 is formed in the front wall of the tensioner housing 210. A clip 220 is formed on the base 144 along the axis of motion for its associated tensioner housing 210. Respective ends of the extension spring 216 are detachably connected to the aperture 201 and clip 220 The module belt 160 is mounted by forcibly sliding the tensioner house towards the front of the bin module 20, thereby stretching the extension spring 216. While the tensioner housing 210 is compressed, the module belt 160 is slipped over the tensioner pulley 214 and the associated pulley 204 of the clutch assembly 156 (See FIG. 13). Once released, the tensioner housing 210 returns to its rest position, thereby tightening the module belt 160.

The service switch 168 is attached to the front of the base 144, adjacent to a sidewall 146. The service switch 168 is a normally closed, rocker type. An indicator lamp 222 is mounted thereon. The indicator lamp 222 can be a bulb or an LED. If the indicator lamp 222 emits a white light, a red plastic laminate (not shown) is placed thereover. The plastic laminate creates a red signal which is more noticeable to the operator.

Figure 15:
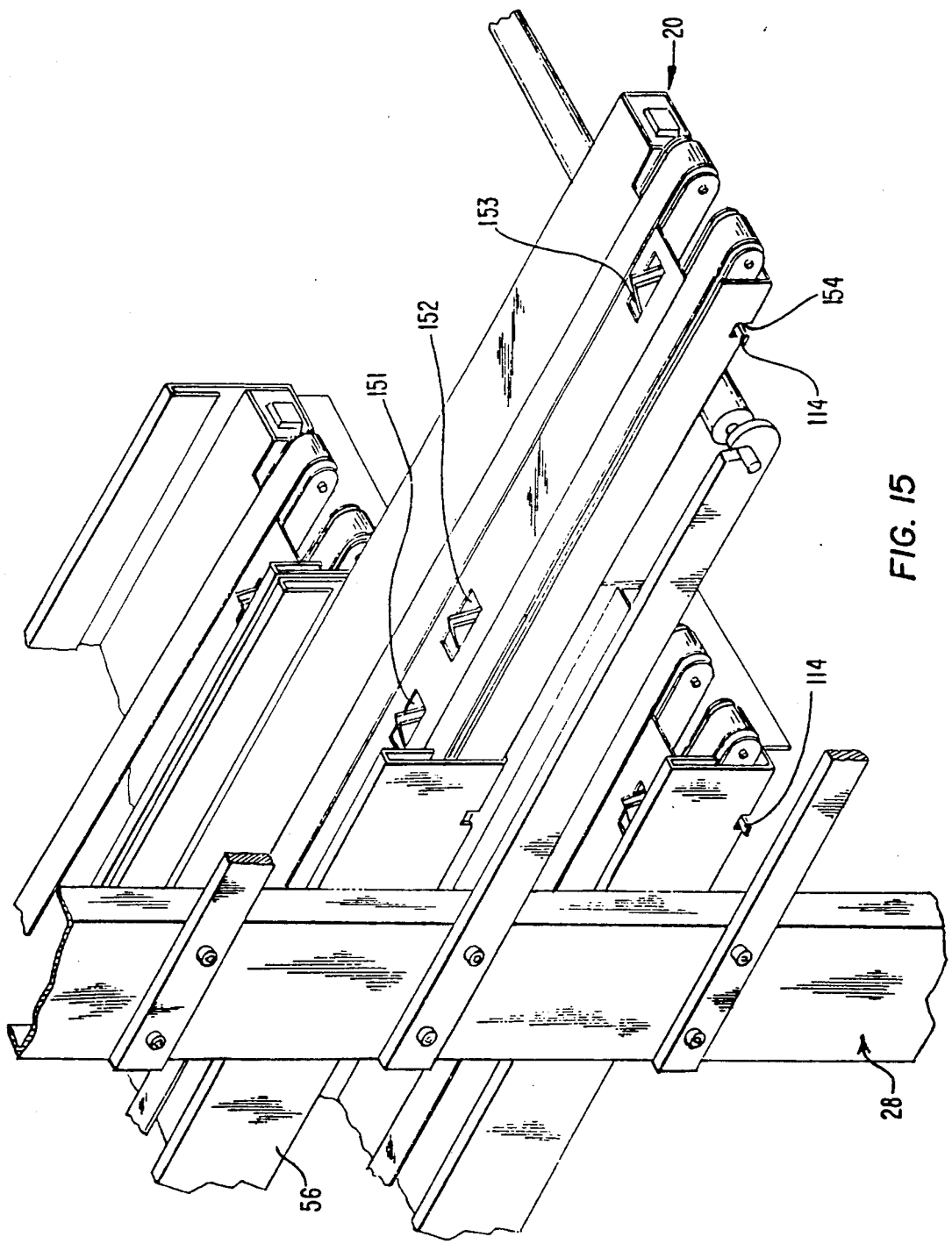
FIG. 15 is a perspective view of a bin module partially detached from the frame of the cluster illustrated in FIG. 1.
Figure 16:
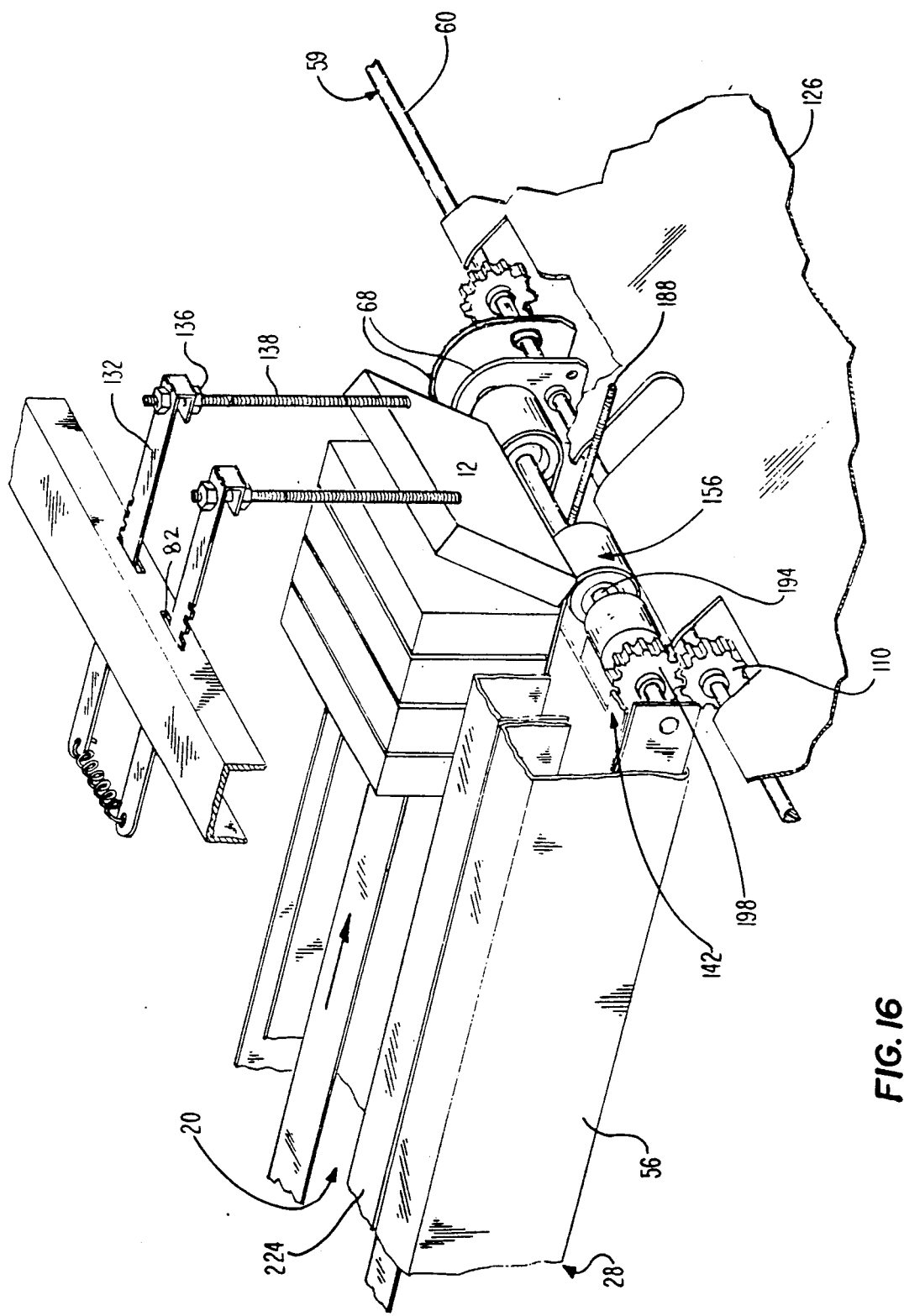
FIG. 16 is a detailed perspective view of a bin module engaged with the primary drive of the cluster illustrated in FIG. 1.

FIGS. 15 and 16 illustrate how the bin module 20 communicates with the frame 28. The bin module 20 is inserted into the module house 56 from the rear. The bin module 20 is slid therealong until the slotted pin 118 on the module house 56 engages the square notch 154 in the bin module sidewall 146; and the clutch assembly 156 communicates with the drive assembly 59, whereby both clutch assembly bearings 188 are received by the notches 70 in their associated frame brackets 68, and the secondary gear 198 is meshed with a primary spur gear 110 see FIG. 16b. Initially, the primary spur gear 110 has to be adjusted along its corresponding axle in order to mesh with the corresponding secondary spur gear 198. Once positioned accordingly, the primary spur gear 110 is fastened to the axle by such means as a set screw. With the bin module 20 properly positioned within the module house 56 and the clutch assembly 156 cooperating with the drive assembly 59, the input shaft 194 can be rotated by actuating the drive assembly 59.

Figure 16B:
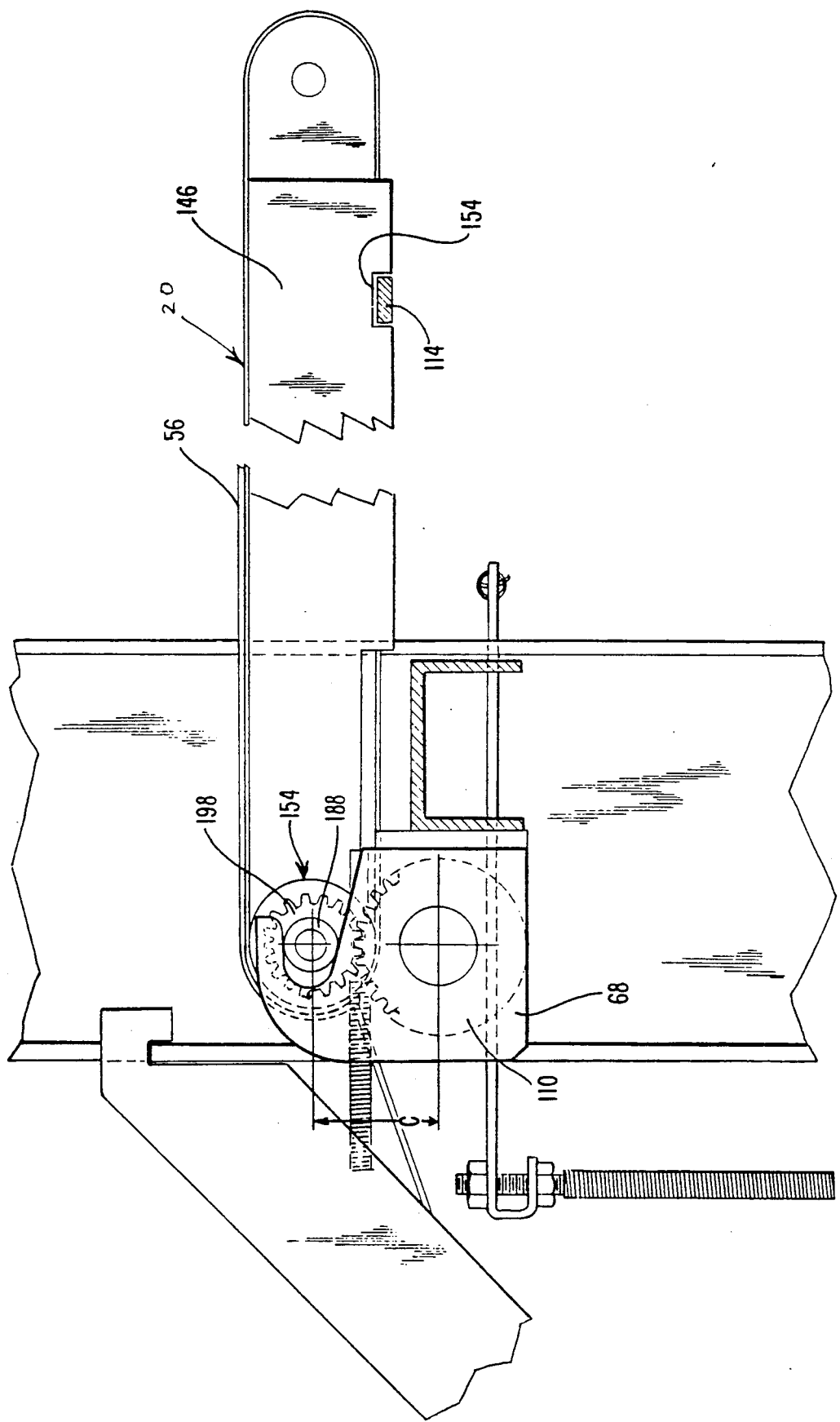
FIG. 16b is a detailed schematic diagram of a bin module engaged with the primary drive of the cluster illustrated in FIG. 1.

FIGS. 16a and 16b show in greater detail the function of the bracket 68 with respect to the module house 56 and bin module 20. With the bearing 188 nestled within the notch 70 and the slotted pin 118 engaged with the slot 154 on the bin module sidewall 146, acts as a locking means, wherein the longitudinal motion of the bin module 20 is inhibited. The notch 70 guides the bearing 188 into place as the bin module 20 is advanced. The notch 70 acting as an alignment means wherein the teeth of primary and secondary gears 110 and 198 are gradually interconnected by the advancement of the bin modules 20. Furthermore, the notch 70 prevents vertical motion at the front of the bin module 20 which would otherwise disengage the primary and secondary gears. By maintaining the centerline distance C therebetween, the primary and secondary gears 110 and 198 remain meshed.

After the bin module 20 is mounted within the module house 56, the counter lever 188 is adjusted so it extends over the chute 126. Next, the stop spring assemblies 130 are horizontally and vertically adjusted so the stop springs 138 contact the upper half of the first package 12 at the edge of the bin module 20. Finally, to accommodate packages of various widths, a spacer 224 is positioned between the packages 12 and the module house 56 and rested on tho bin module base 144. The spacer 224 eliminates lateral motion on the packages 12 as they are transported along the bin module 20.

Figure 17:
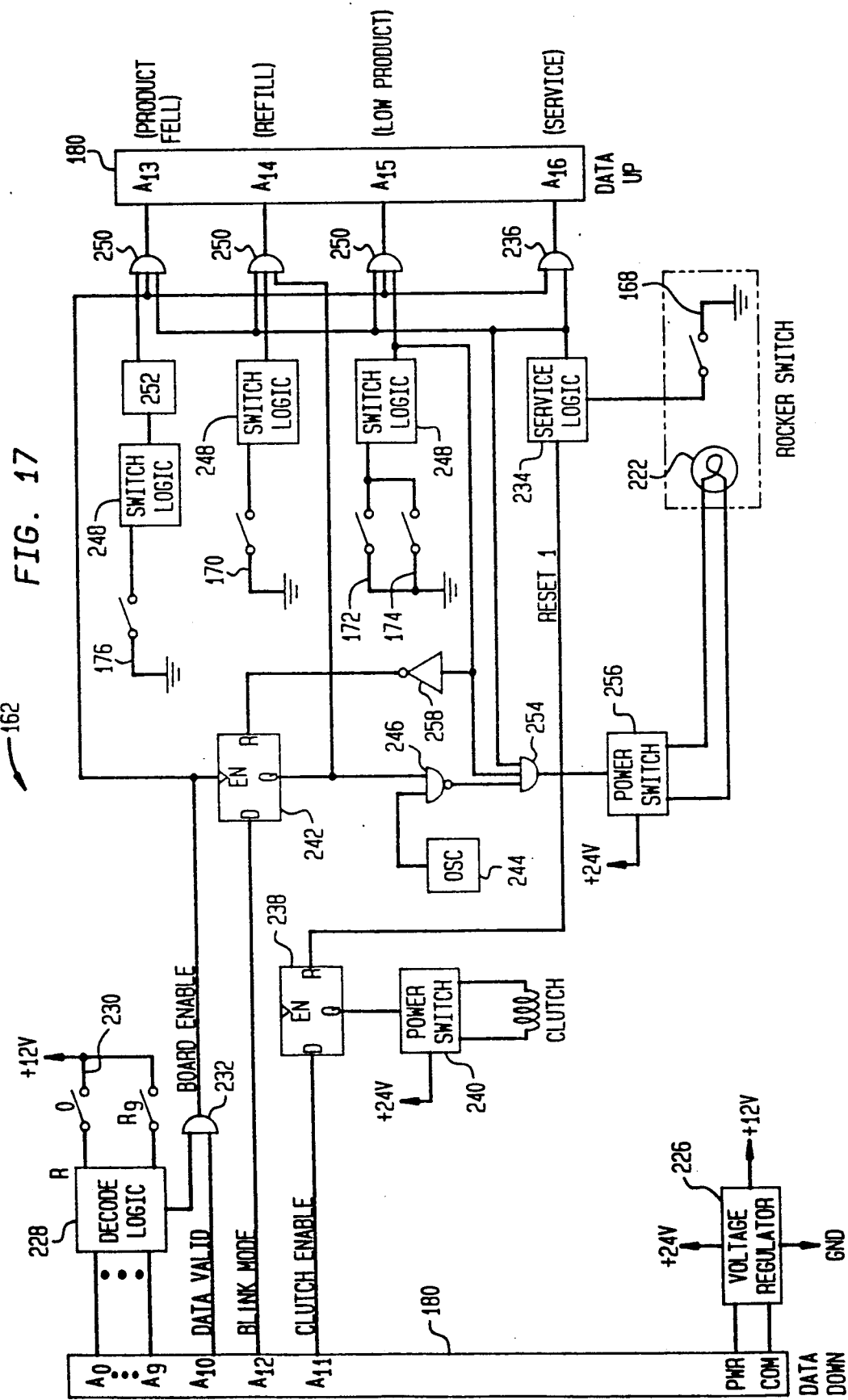
FIG. 17 is a detailed block diagram depicting the digital circuit apparatus of the bin interface module which forms part of the bin module illustrated in FIG. 11.
Figure 18:
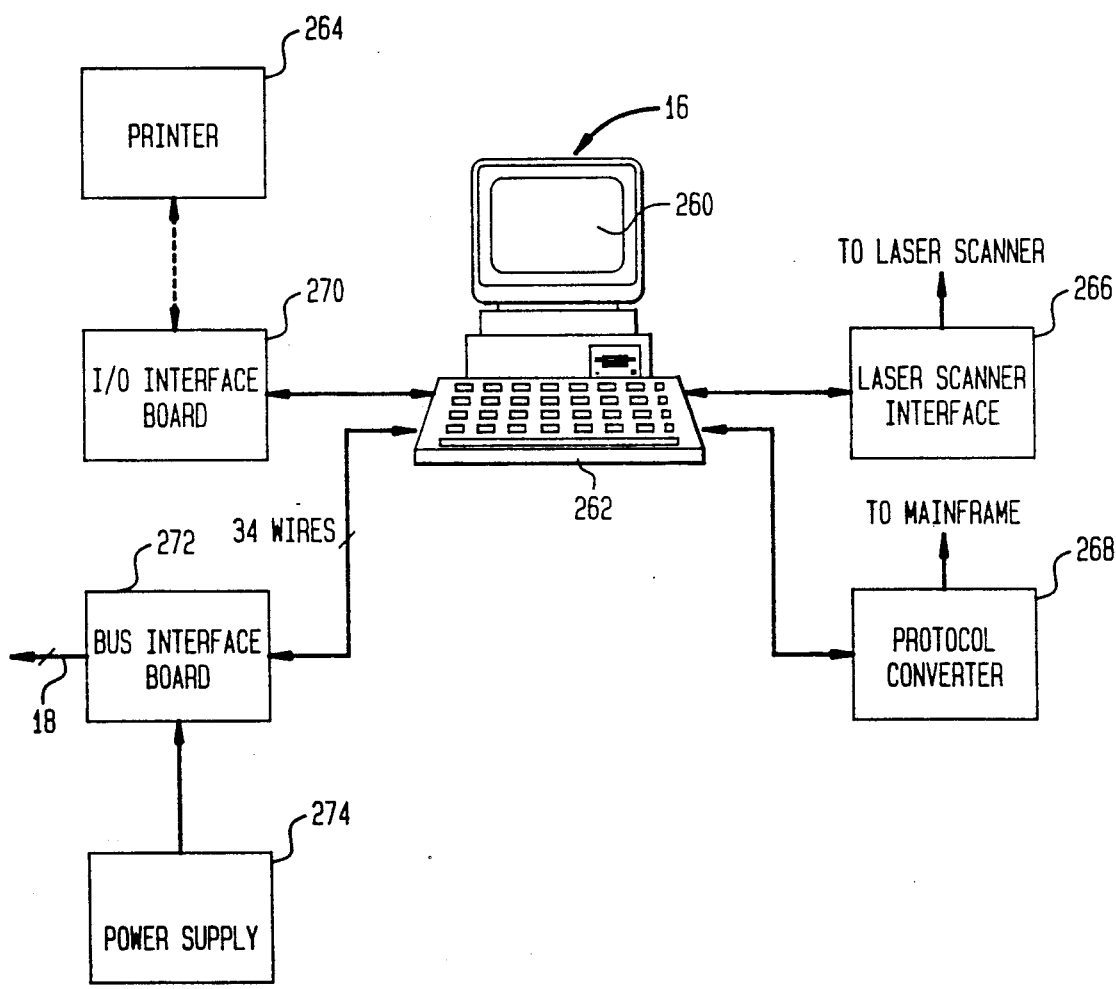
FIG. 18 is a schematic illustration of the interface cards and peripheral devices of the host computer which forms a part of the Automatic Distribution Machine illustrated in FIG. 1.
Figure 19:
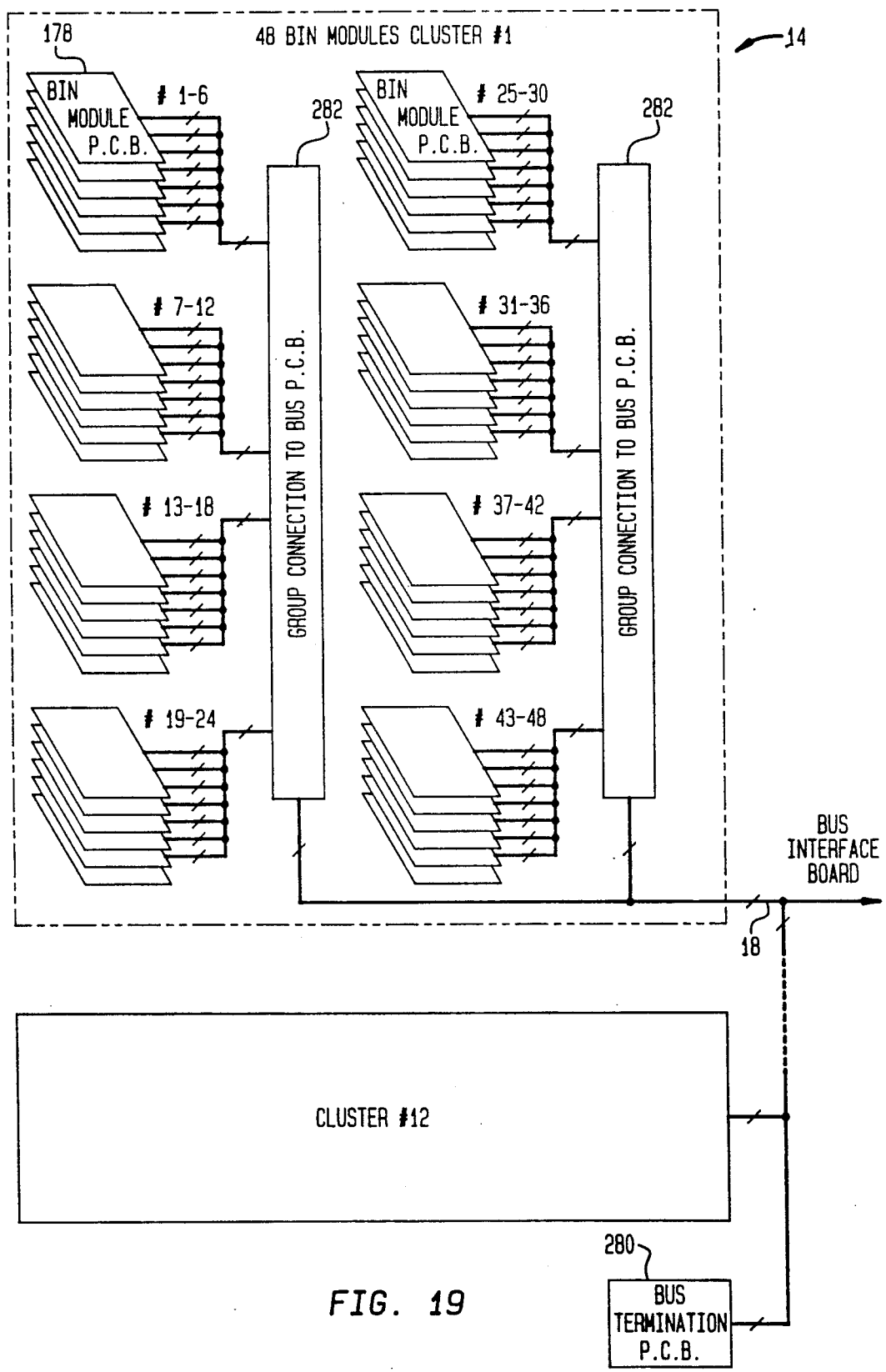
FIG. 19 is a schematic illustration of the connections between the data bus and the bin interface modules which form part of the Automatic Distribution Machine illustrated in FIG. 1.
Figure 20:
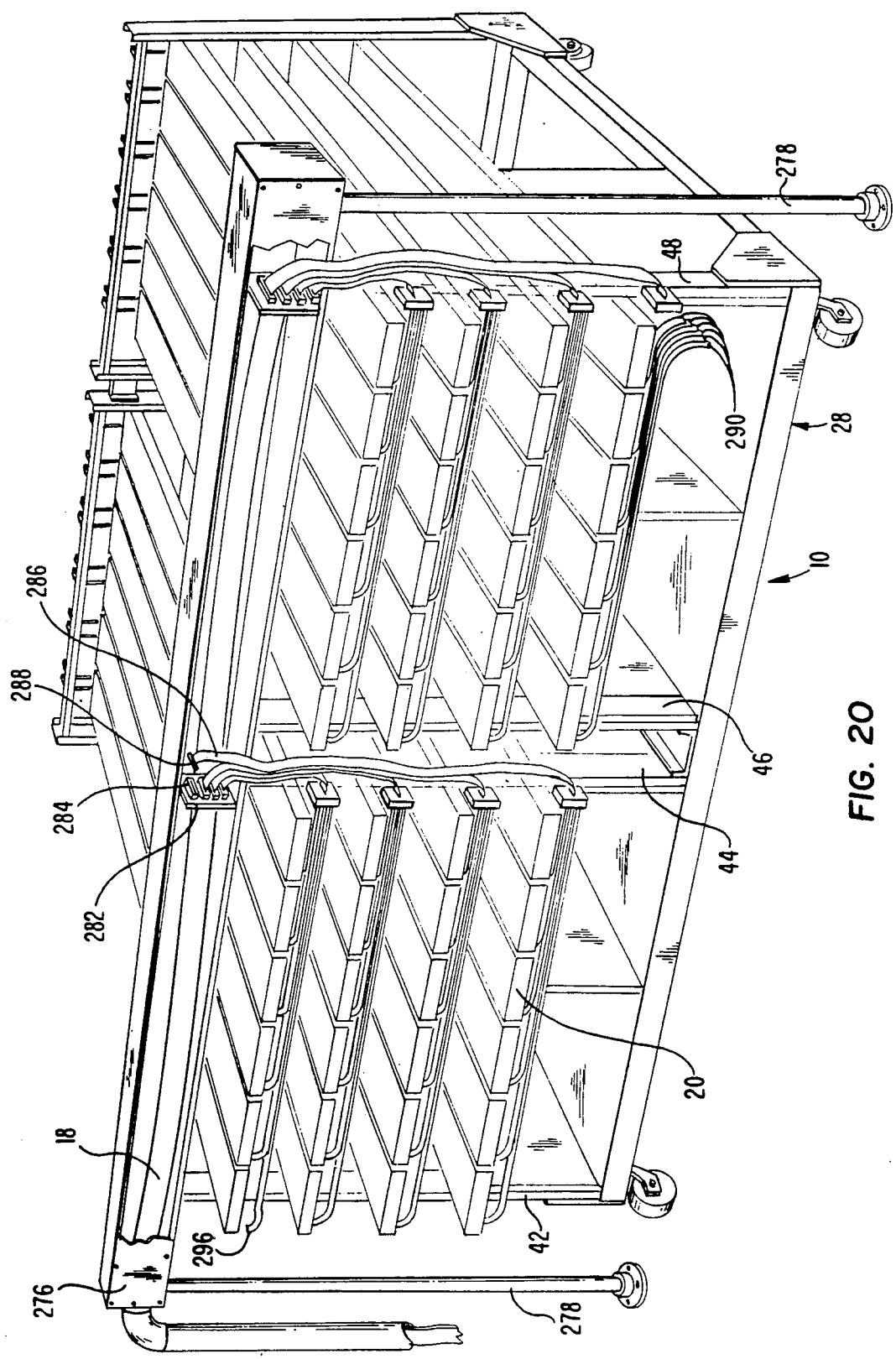
FIG. 20 is a perspective view of the data bus which forms a part of the Automatic Distribution Machine illustrated in FIG. 1, with the rear cross links and portions of the bus house removed and one module connector disconnected from the data bus for clarity.

The electronics of the Automatic Distribution Machine 8 are illustrated in FIGS. 17-20. The electrical components of the bin module 20 are depicted by a block diagram in FIG. 17. FIGS. 18 and 19 illustrate the host computer 16 and its peripheral devices. The apparatus for facilitating communications between the host computer 16 and bin modules 20 is shown in FIGS. 19 and 20.

The bin interface module 162 is the actuating means for controlling the bin module 20. Referring now to FIG. 17, a block diagram of the electronic components of the bin interface module 162 is shown therein. Seventeen lines of the 34-line ribbon 180 connect the bin interface module 162 to the data bus 12 (see FIG. 19). These seventeen lines are and designated the A0-A16 lines. The DATA DOWN lines, sending transmissions from the host computer 16 to the bin module 20, are the A0-A12 lines: the A0-A9 lines send the bin module address; the A10 line sends the DATA VALID signal; the A11 line sends the CLUTCH ENABLE command; and the A12 line sends the BLINK MODE command. The DATA UP lines, sending transmissions from the bin module 20 to the host computer 16, are the A13-A16 lines: the A13 sends the PRODUCT FELL signal; the A14 line sends the REFILL signal; the A15 line sends the LOW PRODUCT signal; and the A16 line sends the SERVICE signal. Remaining lines are the PWR line which provides a twenty four volt, direct current power supply to the bin module 20, and the COM line which provides the common ground. The assignment of bus lines is purely arbitrary and can be modified by someone skilled in the art.

The following is the mode of operation of each block in the bin interface module 162:

VOLTAGE REGULATOR 226: the PWR line and COM lines arc coupled to the inputs of this block which supplies two sources of operating potential (+24V and +12V) and a reference potential (GND) to the bin module 20. The first source (+24V) supplies twenty four volts of direct current to the electromagnetic clutch 190 and indicator lamp 222. The second source (+12V) supplies twelve volts of direct current to the bin interface module 162. The reference potential (GND) supplies a "logic zero" or low input to the bin interface module 162. The VOLTAGE REGULATOR 226 is linearvoltage regulator, such as the MC78T12, available from Motorola.

DECODE LOGIC 228: the A0-A9 lines are coupled to a first set of inputs to this block; DIP switches 230 designated R0-R9 are coupled to a second set of inputs. The R0-R9 DIP switches 230 are also coupled to the second source of operating potential (+12V). Each DIP switch 230 is turned "on" (high input) or "off" (low input), thereby setting the address of the bin module 20. The output of the DECODE LOGIC 228 is coupled to one input of an AND gate 232; the A10 (DATA VALID) line is coupled to the other input. The output of the AND gate 232 is the BOARD ENABLE line. When the first set of inputs provided by the A0-A9 lines (the address commanded by the host computer 16) matches the second set of inputs provided by the R0-R9 DIP switches 230 (the bin module 20 address), the DECODE LOGIC 228 generates a clock pulse to the input of the AND gate 232 If the A10 line is also high, the AND gate 232 provides a clock pulse on the BOARD ENABLE line. The DECODE LOGIC 228 can be formed by the parallel connection of three 4-bit magnitude comparators, such as the CD4585, available from RCA. The two unused bits are grounded.

SERVICE LOGIC 234: The service switch 168 is connected between the input of this block and the source of reference potential (GND). The SERVICE LOGIC 234 has two outputs: the UP line, and the RESET1 line. The UP and BOARD ENABLE lines are coupled to respective inputs of AND gate 236. The output of AND gate 236 is the A16 (SERVICE) line. When the service switch 168 is open, indicating that the bin module 20 is in service, the SERVICE LOGIC 234 provides a high output on the UP line and a low output on a RESET1 line. If a clock pulse is on the BOARD ENABLE line, AND gate 236 provides a clock pulse on the A16 (SERVICE) line. When the service switch 168 is closed, indicating that bin module 20 is out of service, the SERVICE LOGIC 234 provides a low output on the UP line and a high output on the RESET1 line. A low input on the UP line always results in a low input on the A16 (SERVICE) line.

LATCH A 238: The A11 (CLUTCH ENABLE) line is coupled to the D input of this block. The BOARD ENABLE line connects to the EN input. A clock pulse on the BOARD ENABLE line enables LATCH A 238. The RESET1 line connects to the R input. A clock pulse on the RESET1 line sets the Q output to a low state. The state of the A11 line (high=enable; low=disable) is transferred to the Q output of this block on the positive going edge of the clock pulse generated by the DECODE LOGIC 228 on the BOARD ENABLE line. The Q output retains its state until the DECODE LOGIC 228 generates the next clock pulse the SERVICE LOGIC resets the LATCH A 238 via a clock pulse on the RESET1 line. A low input on the RESET1 line does not affect the Q output of LATCH A 238.

POWER SWITCH A 240: The Q output of LATCH A 238 is coupled to the input of this block. When the Q output of LATCH A 238 is high, POWER SWITCH A 240 electrically connects the electromagnetic clutch 190 to the first source of operating potential (+24V), thus actuating it. POWER SWITCH A 240 can be a power transistor, relay contact or other switching device.

LATCH B 242: The A12 (BLINK MODE) line is coupled to the D input of this block The BOARD ENABLE line is connected to the EN input; a clock pulse on the BOARD ENABLE line enables LATCH B 242 The RESET2 line is connected to the R input The state of the A12 line (high=blink; low=off) is transferred to the Q output of this block on the positive going edge of the clock pulse generated by the DECODE LOGIC 228 on the BOARD ENABLE line. The Q output retains its state until the DECODE LOGIC 228 generates the next clock pulse or a clock pulse on the RESET2 line resets the Q output. A low input on the RESET2 line does not affect the Q output of LATCH B 242.

OSC 244: The output of this block and the Q output of LATCH B 242 are coupled to respective inputs of NAND gate 246. When the Q output of LATCH B 242 is high, OSC 244 generates a square wave. The frequency of the square wave is determined by a capacitor and charging resistor (not shown), which determines the rate at which the indicator lamp 222 blinks. The output of OSC 244 is inverted by the NAND gate 246.

SWITCH LOGIC 248: The input to this block is connected to the reference potential (GND) via a switch 170, 172, 174 or 176 The output is coupled to the first input of a multiple input AND gate 250. The SWITCH LOGIC 248 and AND gate 250 correspond to each of the following DATA UP lines: PRODUCT FELL, REFILL, and LOW PRODUCT Therefore, the output each AND gate 250 is associated with one DATA UP line. When the switch 170, 172, 174 or 176 is closed, the SWITCH LOGIC 248 supplies a high output When the switch 170, 172, 174 or 176 is open, a low output is provided by the SWITCH LOGIC 248.

A debounce circuit 252 is connected between the SWITCH LOGIC 248 and AND gate 250 corresponding to the counter switch 176 The function of a debouncing circuit is to prevent multiple pulses from being output by the counter switch 176. Many such types of these devices are well known in the digital field.

AND gate 254 and POWER SWITCH B 256: The output of the NAND gate 246, the UP line of the SERVICE LOGIC 234, and the output of the SWITCH LOGIC 248 for the LOW PRODUCT circuit are directed to multiple inputs of a common AND gate 254. The output of the AND gate 254 is coupled to the input of POWER SWITCH B 256. Whenever at least one input to the AND gate 254 is low, POWER SWITCH B 256 electrically connects the indicator lamp 222 to the first source of operating potential (+24V), thus causing the it to illuminate. POWER SWITCH B 256 can be a power transistor, relay contact or other switching device Thus, the indicator lamp 222 blinks on and off at a rate determined by the frequency and width of the square wave generated by OSC 244.

The following paragraphs describe the mode of operation for the A13 (PRODUCT FELL), A14 (REFILL) and A15 (LOW PRODUCT) lines:

PRODUCT FELL: The counter switch 176 is connected between the input of its associated SWITCH LOGIC 248 and reference potential (GND) The BOARD ENABLE AND UP lines are coupled to the second and third inputs of the AND gate 250. The output of the AND gate 250 is the A13 line. After the counter switch 176 is momentarily depressed, the switch oscillates (due to the switch spring) thereby causing the SWITCH LOGIC to output a stream of pulses. The debounce circuit 252 latches onto the first pulse and provides a high input to its associated AND gate 250. If at the same time the service switch is on (UP=HIGH) and the board is enabled (clock pulse on BOARD ENABLE), the AND gate 250 provides a clock pulse on the A13 line.

REFILL: the first limit switch 170 is connected between the input of its associated SWITCH LOGIC 248 and the reference potential (GND) The output Q output of LATCH B 242, and the UP line are coupled to the second and third tiple inputs of AND gate 250, respectively. The output of the AND gate 250 is the A14 line When the board is enabled (BOARD ENABLE =HIGH), BLINK MODE is commanded (Q output of LATCH B =HIGH), and the first limit switch 170 is open, the AND gate 250 provides a high output on the A14 line. When the limit switch is closed, the AND gate 250 provides a low output on the A14 line.

LOW PRODUCT: the second and third limit switches 172 and 174 are connected in parallel between the input of its associated SWITCH LOGIC 248 and the reference potential (GND). The BOARD ENABLE and UP lines are coupled to second and third inputs of AND gate 250. The output of the AND gate 250 is the A15 line. The output line is also inverted by an INVERTER and coupled to the R input of LATCH B 242. When the board is enabled (BOARD ENABLE=HIGH), the bin module is in service (UP=HIGH), and both reload switches 172 and 174 are open, the AND gate 246 provides a high output on the A15 line. The corresponding low output by the INVERTER 258 does not affect the Q output of LATCH B 242. When either switch 172 or 174 is closed, the SWITCH LOGIC 248 causes the AND gate 250 to provide a low output on the A15 line. The resulting high output from the INVERTER 258 causes the Q output of LATCH B 242 to go low.

Referring now to FIG. 18, the host computer 16 can be a personal computer such as the IBM XT. The host computer 16 is equipped with the following peripheral devices to control the sorting operation: graphics monitor 260, keyboard 262 and printer 264, and a laser scanner interface board 266, protocol converter card 268, input/output interface board 270 and bus interface board 272. The bus interface board 272 has its own power supply 274. The laser scanner interface board 266 allows for signals to be input to the host computer 16 by the laser scanner 22 (See FIG. 1). The protocol converter card 268 allows for communication between the host computer 16 and a mainframe (not shown). The graphics monitor 260 displays the status of the Automatic Distribution Machine 1 during the sorting operation. The input/output. interface board 270 allows the operator to control the sorting operation from a keyboard 262; it also allows the host computer 16 to perform any suitable input/output operation such as printing with a printer 264.

The bus interface board 272 connects to the 34-line bidirectional data bus 18, thereby allowing the host computer 16 to communicate with the Automatic Distribution Machine 10. The power supply 274, an AC filter, provides a regulated, twenty four volt DC source to each printed circuit board 178.

Referring now to FIGS. 19-20, the data bus 18 is enclosed in a bus house 276 which extends horizontally over the cluster 14. The bus house 276 can be fixedly attached to the rear posts 42 and 48 of the cluster frame 28, or to an independant set of posts 278. A bus termination printed circuit board 280 connects to the end of the data bus 18. Each half of the cluster 14 is connected in parallel to a bus printed circuit board 282. Four 34-pin female bus connectors 284 connect in parallel with the bus printed circuit board 282. Each female bus connector 284 corresponds to a row of bin modules 20.

A 34-line ribbon 286 has a 34-pin male bus connector 288 at one end, and six 34-pin male bus connectors 290 at the other end. Each male bus connector 288 and 290 is connected in parallel with the ribbon 286. There are eight ribbons 286: one for each row of bin modules 20. The single male bus connector mates 288 with a female bus connector 284 on the bus printed circuit board 282. The ribbon 286 is located behind the middle rear post 44 and underneath the rear cross link (not shown) of its row. Each of the six male bus connectors 290 is positioned under a bin module 20, and is mated with the corresponding 34-pin female connector 166 (See FIG. 8), thereby connecting a row of bin modules 20 to the data bus 18.

A computer program (not shown) controls the sorting operation. The program, residing in the host computer 16, contains a lookup table (See Table 2). The lookup table matches the address of each bin module 20 with the type of product it distributes. The function and scope of the program will become apparent as the sorting operation is described in greater detail The software can be developed by someone skilled in the art, and can be programmed in any language that the host computer 16 supports.

The Automatic Distribution Machine 10 can be expanded through the addition of clusters 14. A cluster 14 can be situated remotely from the host computer 16; it only requires a data bus 18 connection and a means of transporting the packages 12 to the packing area. Each cluster 14 adds new bin modules 20 to the sorting operation. Each new bin module 20 must be assigned a unique address by setting the R0-R9 DIP switches 216 on its DECODE LOGIC 228. The maximum number of bin modules 20 for a sorting operation is determined by the number of address lines used by the DECODE LOGIC 228. For ten data bus lines, as many as $2^{10}$ bin modules 20 may be used. Whenever a new address is assigned, the software must be updated: the new bin module address and corresponding products must be entered in the lookup table.

The modular design of the Automatic Distribution Machine 10 facilitates the replacement of defective bin modules 20. All bin modules 20 are identical; therefore, they are interchangeable. The defective bin module 20 is slid out of the frame 28, and a new bin module 20 is inserted in its place. The R0-R9 DIP switches 216 of the new bin module 20 must be set to either a new address, or the address of the old bin module 20.

To facilitate the disclosure of the sorting operation, a sample operation will be described using a first group of sixteen bin modules 20, addressed from one to sixteen, consecutively, and a second group of sixteen bin modules 20, addressed from seventeen to thirty two, consecutively. Hereinafter, the bin module 20 with its R0-R9 DIP switches 216 set to one will be referred to as BIN MODULE 1; the bin module 20 with its R0-R9 DIP switches 216 set to two will be referred to as BIN MODULE 2, and so on. The service switches 152 of the BIN MODULES 1-16 are in the "ON" position except for BIN MODULE 16.

The operation of the cluster 14 is divided into three phases: pre-sorting, sorting and servicing. The pre-sorting phase involves initializing the cluster 14 for a sorting operation by actuating its mechanical components, enabling communication with the host computer 16, and executing the program residing in the host computer 16. The sorting phase, initiated upon receipt of an order from the mainframe, involves the host computer 16 directing the bin modules 20 to distribute packages 12 by commanding their electromagnetic clutches 176 to engage. The servicing phase involves maintaining a steady supply of packages 12 in the bin modules 20. It runs concurrently with the sorting phase to insure that all orders are filled.

The mechanical components of the cluster 14 are actuated when the input shafts 180 of the electromagnetic clutches 176 are rotating. With particular reference to FIG. 7, the input shafts 180 are rotated by actuating the electric motor 90. The electric motor 9, rotating in a clockwise direction, rotates the first input sprocket 76, axle 60 and output sprocket 78 in a clockwise direction; the first output sprocket 78 rotates the second input sprocket 80, axle 62 and output sprocket 82 in a clockwise direction; the second output sprocket 82 rotates the third input sprocket 84, axle 64 and output sprocket 86 in a clockwise direction; and the third output sprocket 86, rotates the fourth input sprocket 88 and axle 66 to rotate in a clockwise direction. At all times, the chain tensioners 104 remove the slack from their respective chains 96, 98, 100, 102. The four rotating axles 60, 62, 64, 66 rotate the primary spur gears 110 in the same clockwise direction, thereby rotating the intermeshed secondary spur gears and input shafts 180 in a counterclockwise direction.

Communication with the host computer 16 is enabled by setting the service switches 152 of the bin modules 20 to the "ON" position. The service switches need be set only for the bin modules 20 used during the sorting operation. With particular reference to FIG. 12, the SERVICE LOGIC 234 provides a high output on the UP line, which enables the DATA UP lines. The SERVICE LOGIC also provides a low input on the RESET1 line, which allows LATCH A to assume the state of the A11 (CLUTCH ENABLE) line. When the service switch 168 is placed in the "OFF" position, the bin module 20 does not communicate with the host computer the SERVICE LOGIC 234 provides a high output on the RESET1 line and a low output on the UP line. The high output on the RESET1 line prevents the electromagnetic clutch 190 from engaging. By forcing the Q output of LATCH A 238 to a low state, POWER SWITCH A does not supply the +24V signal to the electromagnetic clutch 190. The low output on the UP line disables the DATA UP lines by driving the outputs of the AND gates 222, 246, 250, 254 to low states. The low output on the UP line also forces a low output on the AND gate 254 which causes POWER SWITCH B 256 to send a +24V signal to the indicator lamp 222, thereby illuminating it. When the service switch 168 is returned to the "ON" position, the software commands the bin module 20 to a BLINK MODE, which will be discussed later.

Once the computer program is executed, the host computer 16 communicates with the enabled bin modules 20. By polling the bin modules 20, the host computer 16 receives outputs on the DATA UP lines, and sends commands on the DATA DOWN lines. Bin modules 20 are polled in groups of sixteen. The host computer 16 polls one bin module 20 at every clock pulse. Typically, a bin module 20 is polled once every one hundred and fifty milliseconds. The high frequency of the clock pulses allows for the bin modules 2 to be commanded almost simultaneously. Hereinafter, the first reference clock pulse is the first clock pulse in a polling sequence for a group of bin modules 20.

Prior to the sorting phase, the host computer 16 determines the status of the bin modules 20 for a sorting operation by examining the A15 (LOW PRODUCT) and A16 (SERVICE) lines. The host computer 16 commands the bin modules 20 to send their outputs on the A15 and A16 lines. For the first group of BIN MODULES 1-16, for example, the host computer commands the bus interface board 272 to set the A0 (BIN MODULE I address) and A10 (DATA VALID) lines high. On the first reference clock pulse, the command is sent down the data bus 18 to all the bin modules 20 in the cluster 14; however, only the DECODE LOGIC 228 of BIN MODULE 1, with its R0-R9 DIP switches 216 set to one, generates a clock pulse to the AND gate 232. Because the A10 line is high, the AND gate 232 generates a clock pulse on the BOARD ENABLE line. With the service switch 168 in the "ON" position (UP = HIGH), AND gate 254 provides a clock pulse on the A16 line. The host computer 16 receives the high output, indicating that BIN MODULE 1 is enabled. The host computer 16 also receives the state of the LOW PRODUCT circuit on the A15 line. A detailed description of the LOW PRODUCT circuit will be provided hereinafter.

From the second to the fifteenth clock pulses, the host computer 16 commands BIN MODULES 2-15 to provide outputs on the DATA UP lines. On the sixteenth clock pulse, the A5 (BIN MODULE 16 address) and A10 (DATA VALID) lines go high. Similarly, the DECODE LOGIC 228 of BIN MODULE 2, with its R0-R9 DIP switches 216 set to sixteen, generates a clock pulse to AND gate 232. Because the A10 line is high, AND gate 232 provides a clock pulse on its BOARD ENABLE line. With the service switch 168 of BIN MODULE 2 in the "OFF" position (UP = LOW), the DATA UP lines are disabled; therefore, the outputs on the A15 and A16 lines are low. After BIN MODULE 16 is polled, the host computer 16 proceeds to the next group of BIN MODULES 17-32.

The sorting phase initiates when the host computer 16 receives an order from the mainframe or laser scanner 22. The order comprises a variety of products and their respective quantities. The host computer 16 groups the orders into a table, for example, as follows:

TABLE 1

| Product | Order 1 | Order 2 | Order 3 |
|---------|---------|---------|---------|
| A | 3 | 2 | 1 |
| B | 2 | 1 | 4 |
| C | 0 | 0 | 0 |
| . | . | . | . |
| . | . | . | . |
| Y | 0 | 0 | 0 |
| Z | 1 | 1 | 2 |

Here, ORDER 1 consists of three units of PRODUCT A, two units of PRODUCT B, and one unit of PRODUCT Z. The host computer 16 then determines the bid module address for each product from a lookup table, for example, as follows:

TABLE 2

| Product | A | B | C | ... Z |
|---------|---|---|---|-------|
| Address | 1 | 2 | 3 | ... 26 |

The host computer 16 groups the products according to their bind module addresses: PRODUCTS A and B, corresponding to BIN MODULES 1 and 2 respectively, are in the first group; and PRODUCT Z, corresponding to BIN MODULE 26, is in the second group. If one of the aforementioned bin modules is not in service, the host computer 16 informs the operator on the graphics display 266 that the corresponding product is unavailable.

The next time the host computer 16 polls the first group of BIN MODULES 1-16, it commands the electromagnetic clutches 176 of BIN MODULES 1 and 2 to engage. On the first reference clock pulse, the host computer 16 commands the electromagnetic clutch 190 of BIN MODULE 1 to engage: the A0 (BIN MODULE 1 address), A10 (DATA VALID),and A11 (CLUTCH ENABLE) lines are set high. During the second clock pulse, the host computer commands the electromagnetic clutch 190 of BIN MODULE 2 to engage by setting the A0 (BIN MODULE 2 address), A10 (DATA VALID),and A11 (CLUTCH ENABLE) lines high. During the third to sixteenth clock pulses, only the addresses of BIN MODULES 3-16 are placed on the A0-A9 lines; therefore, the electromagnetic clutches 176 of BIN MODULES 3-16 are not commanded to engage.

During the first reference clock pulse, the DECODE LOGIC 228 of BIN MODULE 1, having its R0-R9 DIP switches set to address one, generates a clock pulse. With the A10 line high, the AND gate 232 provides a clock pulse on the BOARD ENABLE line which enables LATCH A 238. The Q output of LATCH A 238 assumes the high state of the A11 (CLUTCH ENABLE) line which actuates POWER SWITCH A 240. POWER SWITCH A 240 sends a +24V signal to the clutch 190, which causes the input shaft 194 to electromagnetically engage with the output shaft 196. The input shaft 194 and output shaft 196 remain engaged until LATCH A 238 changes its state. The input shaft 194, already rotating in a counterclockwise direction, rotates the output shaft 196 and pulley shaft 200 in a counterclockwise direction. As a result of the friction between the taut module belts 160 and the knurling 206 on the pulleys 204, the module belts 160 also rotate in a counterclockwise direction. The module belts 160 linearly advance PRODUCT A towards the front of BIN MODULE 1.

At the seventeenth clock pulse, the host computer 16 would normally proceed to poll the next group of BIN MODULES 17-32 however, the host computer 6 continues polling BIN MODULES 1-16 until all clutch commands within that group have been removed. At the seventeenth clock pulse, the host computer 16 once again commands the electromagnetic clutch 190 of BIN MODULE 1 by setting the A0 and A10-A11 lines high. Since the A11 line is still high, the Q output of LATCH A 238 retains its high state; therefore, the electromagnetic clutch 190 remains engaged. The clutch command also causes BIN MODULE 1 to return the status of the PRODUCT FELL circuit. The host computer 16 examines the A13 (PRODUCT FELL) line for a high output which would indicate that one unit of PRODUCT A was distributed by BIN MODULE 1.

As the module belts 160 advance the units of PRODUCT A towards the end of BIN MODULE 1, the stop springs 138 make contact with the upper portion of the first unit, thereby stopping its motion. As the module belts 160 continue to rotate, the lower portion of the first unit of PRODUCT A advances off the end of BIN MODULE 1. Before falling down the chute 126, the unit depresses the counter lever 188 which opens the spring-biased, counter switch 176. The undampened vibrations due to the spring cause the counter switch 176 to open and close repeatedly As a result, the SWITCH LOGIC 248 sends multiple pulses to the debounce circuit 252. The first pulse triggers the debounce circuit 252, which latches onto a high state, thereby sending a high input to the AND gate 254. During the next clutch command to BIN MODULE I (BOARD ENABLE =HIGH), the AND gate 254 provides a high output on the A13 line, indicating to the host computer 16 that one unit of PRODUCT A fell. The software provides additional protection against registering multiple pulses. After the host computer 16 receives the first pulse, it disregards the pulses that immediately follow as long as BIN MODULE 1 is polled. Once time has elapsed for BIN MODULE 1 to distribute the next package 12, the host computer 16 resumes examining the output.

After the unit of PRODUCT A depresses the counter switch 176, it travels down the chute 126, where its descent onto the conveyor belt 24 is slowed by the flap. Once the unit lands on the conveyor belt 24, it is advanced toward the packing area. The pneumatic gate 26 delays the unit from reaching the packing area until ORDER 1 is complete, and one unit of PRODUCT Z has arrived In the meantime, BIN MODULE 2 is distributing PRODUCT B in a similar manner.

The electromagnetic clutch 190 of BIN MODULE 1 remains engaged until the host computer 16 receives three pulses over the A13 line. After receiving the third pulse, the host computer 16 commands the electromagnetic clutch 190 to disengage. The next time BIN MODULE 1 is polled, the host computer 16 sets the A0 and A10 lines high The DECODE LOGIC 228 of BIN MODULE 1 generates a clock pulse. With the A10 line high, the AND gate 232 provides a clock pulse on the BOARD ENABLE line which enables LATCH A 238. The Q output of LATCH A 238 assumes the low state of the A11 line, causing POWER SWITCH A 240 to remove the +24V signal from the electromagnetic clutch 190. After the input shaft 194 disengages with the output shaft 196, the output shaft 196, pulleys 204, 200, module belts 160, and packages 12 come to a rest. The stop springs 138 prevent another unit of PRODUCT A, teetering on the edge of BIN MODULE 1, from falling down the chute 126 Assuming that PRODUCT B has already been distributed, the host computer 16 polls the remaining bin modules 20 in the first group, and then proceeds to poll the second group.

While polling the second group of BIN MODULES 17-32, the host computer 16 actuates the electromagnetic clutch 190 for BIN MODULE 26 until it receives one pulse on the A13 line. To allow the unit of PRODUCT Z to travel from the cluster 14 to the gate 26, the gate 26 remains closed for a pre-determined amount of time until ORDER 1 is assembled. This time delay is a function of the distance of the cluster 14 from the gate 26, and the conveyor belt 24 speed. After the unit of PRODUCT 2 arrives, the gate 26 opens, allowing ORDER 1 to advance to the packing area. Then, the gate 26 closes, and ORDER 2 is distributed. At the packing area, ORDER 1 is manually placed in a box. The printer prints out an invoice which is included with ORDER 1.

The servicing phase is facilitated by the indicator lamp 222, which informs the operator when a bin module 20 needs to be serviced. Referring with particularly to FIG. 12, the LOW PRODUCT circuit illuminates the indicator lamp 222 when a bin module 20 needs to be replenished. Once enough packages 12 have been distributed such that one or both of the reload switches 172, 174 are released, the associated SWITCH LOGIC 248 provides a low input to AND gate 246. The low input drives the output of the AND gate 246, the A15 line, to a low state, indicating to the host computer 16 that the module needs to be replenished. The low output of the SWITCH LOGIC 248 also drives the output of the AND gate 254 to a low state. The low output from AND gate 254 causes POWER SWITCH B 256 to send a +24V signal to the indicator lamp 222, thereby illuminating it. The indicator lamp 222 remains illuminated until both reload switches 172 and 174 are depressed. The low output of the SWITCH LOGIC 248 drives the output of the INVERTER 248, the RESET2 line, to a high state, thereby providing a high R input to LATCH B 242. The high input forces the Q output of LATCH B 242 to a low state, thereby disabling the blink mode.

When a bid module 20 is full, its indicator lamp is extinguished. Its packages depress both reload switches 172, 174; therefore, the associated SWITCH LOGIC 248 provides a high input to the AND gate 246. When the service switch 168 is "ON" (UP=HIGH) and the bin module 20 is being polled (BOARD ENABLE=-HIGH), the AND gate 246 provide a high output on the A15 line, indicating to the host computer 16 that the bin module 20 does not have to be replenished. The high output of the SWITCH LOGIC 248 also generates a high output from the AND gate 254, which causes POWER SWITCH B 256 to remove the +24 signal from the indicator lamp 222, thereby extinguishing it.

To replenish a bin module 20, the operator first removes a box from a storage bin. The box has a label with a bar code identifying its contents. Using the laser scanner 22, the operator scans the bar code, thereby transmitting the product type to the host computer 16. The transmission interrupts the normal operation of the host computer 16. When the host computer 16 receives the input, it uses the lookup table to match the product type with the bin module 20 that distributes it. The host computer 16 then commands the indicator lamp 222 of the associated bin module 20 to blink. For example, if PRODUCT A of Tables 1-2 is scanned, the host computer 16 commands BIN MODULE 1 to blink. At the first reference pulse following the input from the laser scanner 22, the host computer 16 sets the A0 (BIN MODULE 1 address), A10 (DATA INVALID), and A12 (BLINK MODE) lines high. The DECODE LOGIC 228 of BIN MODULE 1 generates a clock pulse to the input of AND gate 232. With the A10 line high, the AND gate 232 provides a clock pulse on the BOARD ENABLE line which enables LATCH B 242. The Q output of LATCH B 242 assumes the high state of the A12 (BLINK MODE) line. The high state on the A12 line also actuates OSC 244. When the output of the OSC 244 goes high, the output of the NAND gate 246 goes low, causing the AND gate 254 to provide a low input to POWER SWITCH B 256. POWER SWITCH B 256 sends a +24V signal to the indicator lamp 222 which illuminates it. When the output of OSC 244 changes to a low state, the high output of the NAND gate 246 drives the AND gate 254 high, causing POWER SWITCH B 256 to remove the +24V signal, thereby extinguishing the indicator lamp 222. The oscillating output of OSC 244 causes the indicator lamp 222 to blink; the blinking indicator lamp 222 informs the operator that BIN MODULE 1 must be loaded.

On the seventeenth clock pulse, the host computer proceeds to poll the next group of BIN MODULES 17-32. Unlike the polling sequence following a clutch command, the host computer 16 does not loop within the first group until the blink mode of BIN MODULE 1 is terminated. When the operator spots the blinking light on BIN MODULE 1, he loads BIN MODULE 1 with PRODUCT A. The operator rests the box on the rod 116 supported by the shelf brackets 114, and abuts the open end of the box against the box stop 120. For a box with a plurality of rows of packages, the box stop 120 allows only the bottom row of packages to be loaded onto BIN MODULE 1. As the operator forces a row of packages out of the box, the first package depresses the load switch 170 of the REFILL circuit, thereby causing the associated SWITCH LOGIC 248 to provide a high output to the AND gate 250. With BIN MODULE 1 in blink mode (Q output of LATCH B 242 =HIGH), the AND gate 250 provides a high output on the A14 line. The output, interrupting the normal operation of the host computer, instructs the host computer 16 to issue a blink mode disable command. Since only BIN MODULE 1 can be in a blink mode at the given time, the host computer 16 readily identifies it as the bin module 20 to be commanded. The next time BIN MODULE 1 is polled, the host computer 16 sets the A0 (BIN MODULE 1 address) and A10 (DATA VALID) lines high. The DECODE LOGIC 228 of BIN MODULE 1 generates a clock pulse to the input of AND gate 232. With the A10 line high, the AND gate 232 provides a clock pulse on the BOARD ENABLE line which enables LATCH B 242. The Q output of LATCH B 242 assumes the low state of the A12 line, thereby forcing the NAND gate 246 to a high output. The high output from the AND gate 254 causes POWER SWITCH B 256 to remove the +24V signal, thereby extinguishing the indicator lamp 222. The low Q output on LATCH B 242 also disables OSC 244.

It will be understood that the embodiments described herein are merely exemplary and that a person skilled in the art may make many variations and modifications without departing from the spirit and scope of the invention. All such variations and modifications are intended to be included within the scope of the invention as defined in the appended claims.

We claim:

1. A sorting module for distributing packages therefrom, comprising a chassis for storing packages; conveying means, attached to said chassis, for conveying packages stored on said chassis and for distributing packages from said chassis; driving means, attached to said chassis such that said driving means is removably engageable with an external drive, for driving said conveying means; coupling means, attached to said chassis, for coupling said driving means to said conveying means and for uncoupling said driving means from said conveying means; and actuating means, attached to said chassis, for actuating said coupling means, said actuating means being programmable such that said actuating means can be assigned an address corresponding to the contents of packages stored on said chassis.

2. A sorting module according to claim 1 wherein said conveying means includes first and second pulleys located at opposite ends of said chassis and a belt rotated by said first and second pulleys.

3. A sorting module according to claim 1, wherein said driving means includes a gear meshable with another gear on the external drive, and said coupling means couples said gear to said conveying means, whereby the actuation of said coupling means causes the external drive to actuate said conveying means.

4. An expandable distribution machine for distributing packages, comprising:
a plurality of removable and interchangeable sorting modules for distributing packages, each of said sorting modules including a driven gear;

drive means common to all of said sorting modules, said drive means including a plurality of drive gears, each of said drive gears engaging with said driven gear of a corresponding one of said sorting modules; and aligning means for automatically aligning said sorting modules relative to said drive gears such that each of said drive gears engage said driven gear of a corresponding one of said sorting modules when said corresponding one of said sorting modules is added to said distribution machine during the operation of said drive means and such that each of said drive gears disengages said driven gear of a corresponding one of said sorting modules when said corresponding one of said sorting modules is removed from said distribution machine during the operation of said drive means.

5. A machine according to claim 4, wherein each of said plurality of sorting modules includes a chassis for storing packages and conveying means for distributing the packages from said chassis.

6. A machine according to claim 5, wherein said conveying means of each of said plurality of sorting modules includes first and second pulleys located at opposite ends of said channis and a belt rotated by said first and second pulleys.

7. A machine according to claim 5, further comprising a frame, said plurality of sorting modules being arranged in tiers on said frame, and each of said sorting modules being detachable from said frame.

8. A machine according to claim 7, wherein said drive means is housed within said frame, and wherein each of said sorting modules further includes coupling means for coupling said driven gear of a corresponding one of said sorting modules with said drive means.

9. A machine according to claim 8, wherein said drive means includes at least one axis, on which said plurality of drive gears are affixed, and rotating means for rotating said at least one axis, and wherein each of said coupling means connects one of said plurality of drive gears to said conveying means of said corresponding one of said sorting modules, whereby the actuation of said coupling means causes said one axle to actuate said conveying means.

10. A machine according to claim 9, wherein said chassis further includes locking means for locking a corresponding one of said sorting modules to said frame.

11. A machine according to claim 4, further including controlling means for selectively controlling all of said sorting modules.

12. A machine according to claim 11, wherein said controlling means includes polling means for polling each of said modular sorting means and communication means for allowing said polling means to communicate with said each modular sorting means.

13. A machine according to claim 12, wherein said modular sorting means are polled in groups.

14. A machine according to claim 13, wherein said groups are groups of sixteen.

15. A machine according to claim 12, wherein said polling means is a computer.

16. A machine according to claim 12, wherein said communication means includes common hookup means and a plurality of logic means, each of said logic means, connected to said common hookup means, for actuating a corresponding one of said plurality of modular sorting means.

17. A machine according to claim 16, wherein said common hookup means is a data bus.

18. A machine according to claim 16, wherein each of said logic means includes decoder means for decoding a signal sent by said polling means through said common hookup means, and actuating means responsive to said decoder means for actuating said modular sorting means.

19. A machine according to claim 18, wherein each package stores a product, and wherein said modular sorting means packages containing the same product.

20. A machine according to claim 19, wherein each of said decoder means is assigned an address corresponding to the product stored on a corresponding one of said modular sorting means.

21. A machine according to claim 20, wherein said signal includes an address, and wherein at least one of said decoder means having the same address as said address on said signal communicates with its corresponding actuating means.

22. A machine according to claim 18, wherein each of said logic means further includes status means for determining the status of said corresponding one modular sorting means.

23. A machine according to claim 22, wherein said status means includes first detecting means for detecting when a package is distributed by said corresponding one modular sorting means.

24. A machine according to claim 23, wherein said status means includes second detecting means for detecting when the packages from said corresponding one modular sorting means must be replenished.

25. A machine according to claim 24, wherein said status means includes indicating means for indicating which one of said plurality of modular sorting means must be reloaded.

26. A machine according to claim 25, wherein said status means includes third detecting means for detecting when a package has been reloaded onto said corresponding one of said modular sorting means.

27. A machine according to claim 12, wherein said controlling means further includes input means for inputting an order to said polling means.

28. A machine according to claim 4, wherein said common drive means operates continuously.

* * * * *